US011245961B2

(12) United States Patent
Bloch et al.

(10) Patent No.: US 11,245,961 B2
(45) Date of Patent: Feb. 8, 2022

(54) SYSTEM AND METHODS FOR DETECTING ANOMALOUS ACTIVITIES FOR INTERACTIVE VIDEOS

(71) Applicant: JBF Interlude 2009 LTD, Tel Aviv (IL)

(72) Inventors: Jonathan Bloch, Brooklyn, NY (US); Tal Zubalsky, Brooklyn, NY (US); Yuval Hofshy, Kfar Saba (IL); Barak Feldman, Tenafly, NJ (US)

(73) Assignee: JBF Interlude 2009 LTD, Tel Aviv (IL)

( * ) Notice: Subject to any disclaimer, the term of this patent is extended or adjusted under 35 U.S.C. 154(b) by 0 days.

(21) Appl. No.: 16/793,201

(22) Filed: Feb. 18, 2020

(65) Prior Publication Data
US 2021/0258640 A1    Aug. 19, 2021

(51) Int. Cl.
*H04N 21/442* (2011.01)
*H04N 21/8541* (2011.01)
*H04N 21/454* (2011.01)
*H04N 21/8545* (2011.01)

(52) U.S. Cl.
CPC ..... *H04N 21/44218* (2013.01); *H04N 21/454* (2013.01); *H04N 21/8541* (2013.01); *H04N 21/8545* (2013.01)

(58) Field of Classification Search
CPC ......... H04N 21/44218; H04N 21/8545; H04N 21/8541; H04N 21/454; H04N 21/23418; H04N 21/25; H04N 21/251; H04N 21/466; H04L 2463/144; H04L 63/1425; H04L 67/22; G06F 21/316; G06F 2221/2133; G06F 11/3438

USPC .......................................................... 725/14
See application file for complete search history.

(56) References Cited

U.S. PATENT DOCUMENTS

| | | |
|---|---|---|
| 4,569,026 A | 2/1986 | Best |
| 5,137,277 A | 8/1992 | Kitaue |
| 5,161,034 A | 11/1992 | Klappert |
| 5,568,602 A | 10/1996 | Callahan et al. |
| 5,568,603 A | 10/1996 | Chen et al. |
| 5,597,312 A | 1/1997 | Bloom et al. |
| 5,607,356 A | 3/1997 | Schwartz |
| 5,610,653 A | 3/1997 | Abecassls |
| 5,636,036 A | 6/1997 | Ashbey |

(Continued)

FOREIGN PATENT DOCUMENTS

| | | |
|---|---|---|
| CA | 2639491 A1 | 3/2010 |
| DE | 2428329 A1 | 1/1975 |
| DE | 2359916 A1 | 6/1975 |
| DE | 004038801 A1 | 6/1992 |

(Continued)

OTHER PUBLICATIONS

Miriam Marciel, Ruben Cuevas, Albert Banchs, Roberto Gonzalez, Stefano Traverse, Mohamed Ahmed and Arturo Azcorra, Understanding the Detection of View Fraud in Video Content Portals, Feb. 5, 2016, Cornell University, DOI:10.1145/2872427.2882980I, pp. 1-13. (Year: 2016).*

(Continued)

*Primary Examiner* — Cynthia M Fogg
(74) *Attorney, Agent, or Firm* — Goodwin Procter LLP

(57) ABSTRACT

Methods and supporting systems collect data associated with interactive videos user engagement and dynamically adapt an interactive video application and/or interactive video content and detect anomalous behaviors based on the data.

20 Claims, 7 Drawing Sheets

(56) References Cited

U.S. PATENT DOCUMENTS

| | | |
|---|---|---|
| 5,676,551 A | 10/1997 | Knight et al. |
| 5,715,169 A | 2/1998 | Noguchi |
| 5,734,862 A | 3/1998 | Kulas |
| 5,737,527 A | 4/1998 | Shiels et al. |
| 5,745,738 A | 4/1998 | Ricard |
| 5,751,953 A | 5/1998 | Shiels et al. |
| 5,754,770 A | 5/1998 | Shiels et al. |
| 5,818,435 A | 10/1998 | Kozuka et al. |
| 5,848,934 A | 12/1998 | Shiels et al. |
| 5,887,110 A | 3/1999 | Sakamoto et al. |
| 5,894,320 A | 4/1999 | Vancelette |
| 5,956,037 A | 9/1999 | Osawa et al. |
| 5,983,190 A | 11/1999 | Trower, II et al. |
| 6,067,400 A | 5/2000 | Saeki et al. |
| 6,122,668 A | 9/2000 | Teng et al. |
| 6,128,712 A | 10/2000 | Hunt et al. |
| 6,191,780 B1 | 2/2001 | Martin et al. |
| 6,222,925 B1 | 4/2001 | Shiels et al. |
| 6,240,555 B1 | 5/2001 | Shoff et al. |
| 6,298,020 B1 | 10/2001 | Kumagami |
| 6,298,482 B1 | 10/2001 | Seidman et al. |
| 6,460,036 B1 | 10/2002 | Herz |
| 6,535,639 B1 | 3/2003 | Uchihachi et al. |
| 6,657,906 B2 | 12/2003 | Martin |
| 6,698,020 B1 | 2/2004 | Zigmond et al. |
| 6,728,477 B1 | 4/2004 | Watkins |
| 6,771,875 B1 | 8/2004 | Kunieda et al. |
| 6,801,947 B1 | 10/2004 | Li |
| 6,947,966 B1 | 9/2005 | Oko, Jr. et al. |
| 7,085,844 B2 | 8/2006 | Thompson |
| 7,155,676 B2 | 12/2006 | Land et al. |
| 7,231,132 B1 | 6/2007 | Davenport |
| 7,296,231 B2 | 11/2007 | Loui et al. |
| 7,310,784 B1 | 12/2007 | Gottlieb et al. |
| 7,379,653 B2 | 5/2008 | Yap et al. |
| 7,430,360 B2 | 9/2008 | Abecassis |
| 7,444,069 B1 | 10/2008 | Bernsley |
| 7,472,910 B1 | 1/2009 | Okada et al. |
| 7,627,605 B1 | 12/2009 | Lamere et al. |
| 7,669,128 B2 | 2/2010 | Bailey et al. |
| 7,694,320 B1 | 4/2010 | Yeo et al. |
| 7,779,438 B2 | 8/2010 | Davies |
| 7,787,973 B2 | 8/2010 | Lambert |
| 7,917,505 B2 | 3/2011 | van Gent et al. |
| 8,024,762 B2 | 9/2011 | Britt |
| 8,046,801 B2 | 10/2011 | Ellis et al. |
| 8,065,710 B2 | 11/2011 | Malik |
| 8,151,139 B1 | 4/2012 | Gordon |
| 8,176,425 B2 | 5/2012 | Wallace et al. |
| 8,190,001 B2 | 5/2012 | Bernsley |
| 8,202,167 B2 | 6/2012 | Ackley et al. |
| 8,276,058 B2 | 9/2012 | Gottlieb et al. |
| 8,281,355 B1 | 10/2012 | Weaver et al. |
| 8,321,905 B1 | 11/2012 | Streeter et al. |
| 8,350,908 B2 | 1/2013 | Morris et al. |
| 8,600,220 B2 | 12/2013 | Bloch et al. |
| 8,612,517 B1 | 12/2013 | Yadid et al. |
| 8,626,337 B2 | 1/2014 | Corak et al. |
| 8,646,020 B2 | 2/2014 | Reisman |
| 8,650,489 B1 | 2/2014 | Baum et al. |
| 8,667,395 B2 | 3/2014 | Hosogai et al. |
| 8,750,682 B1 | 6/2014 | Nicksay et al. |
| 8,752,087 B2 | 6/2014 | Begeja et al. |
| 8,826,337 B2 | 9/2014 | Issa et al. |
| 8,860,882 B2 | 10/2014 | Bloch et al. |
| 8,930,975 B2 | 1/2015 | Woods et al. |
| 8,977,113 B1 | 3/2015 | Rumteen et al. |
| 9,009,619 B2 | 4/2015 | Bloch et al. |
| 9,021,537 B2 | 4/2015 | Funge et al. |
| 9,082,092 B1 | 7/2015 | Henry |
| 9,094,718 B2 | 7/2015 | Barton et al. |
| 9,190,110 B2 | 11/2015 | Bloch |
| 9,257,148 B2 | 2/2016 | Bloch et al. |
| 9,268,774 B2 | 2/2016 | Kim et al. |
| 9,271,015 B2 | 2/2016 | Bloch et al. |
| 9,363,464 B2 | 6/2016 | Alexander |
| 9,367,196 B1 | 6/2016 | Goldstein et al. |
| 9,374,411 B1 | 6/2016 | Goetz |
| 9,390,099 B1 | 7/2016 | Wang et al. |
| 9,456,247 B1 | 9/2016 | Pontual et al. |
| 9,465,435 B1 | 10/2016 | Zhang et al. |
| 9,473,582 B1 | 10/2016 | Fraccaroli |
| 9,510,044 B1 | 11/2016 | Pereira et al. |
| 9,520,155 B2 | 12/2016 | Bloch et al. |
| 9,530,454 B2 | 12/2016 | Bloch et al. |
| 9,538,219 B2 | 1/2017 | Sakata et al. |
| 9,554,061 B1 | 1/2017 | Proctor, Jr. et al. |
| 9,571,877 B2 | 2/2017 | Lee et al. |
| 9,607,655 B2 | 3/2017 | Bloch et al. |
| 9,641,898 B2 | 5/2017 | Bloch et al. |
| 9,653,115 B2 | 5/2017 | Bloch et al. |
| 9,653,116 B2 | 5/2017 | Paulraj et al. |
| 9,672,868 B2 | 6/2017 | Bloch et al. |
| 9,715,901 B1 | 7/2017 | Singh et al. |
| 9,736,503 B1 | 8/2017 | Bakshi et al. |
| 9,792,026 B2 | 10/2017 | Bloch et al. |
| 9,792,957 B2 | 10/2017 | Bloch et al. |
| 9,826,285 B1 | 11/2017 | Mishra et al. |
| 9,967,621 B2 | 5/2018 | Armstrong et al. |
| 10,070,192 B2 | 9/2018 | Baratz |
| 10,178,304 B1 | 1/2019 | Tudor et al. |
| 10,178,421 B2 | 1/2019 | Thomas et al. |
| 10,187,687 B2 | 1/2019 | Harb et al. |
| 10,194,189 B1 | 1/2019 | Goetz et al. |
| 10,257,572 B2 | 4/2019 | Manus et al. |
| 10,419,790 B2 | 9/2019 | Gersten |
| 10,460,765 B2 | 10/2019 | Bloch et al. |
| 10,523,982 B2 | 12/2019 | Oyman |
| 10,771,824 B1 | 9/2020 | Haritaoglu et al. |
| 11,003,748 B2 * | 5/2021 | Oliker .................. G06F 21/316 |
| 2001/0056427 A1 | 12/2001 | Yoon et al. |
| 2002/0019799 A1 | 2/2002 | Ginsberg et al. |
| 2002/0029218 A1 | 3/2002 | Bentley et al. |
| 2002/0053089 A1 | 5/2002 | Massey |
| 2002/0086724 A1 | 7/2002 | Miyaki et al. |
| 2002/0091455 A1 | 7/2002 | Wiliams |
| 2002/0105535 A1 | 8/2002 | Wallace et al. |
| 2002/0106191 A1 | 8/2002 | Betz et al. |
| 2002/0120456 A1 | 8/2002 | Berg et al. |
| 2002/0120931 A1 | 8/2002 | Huber et al. |
| 2002/0124250 A1 | 9/2002 | Proehl et al. |
| 2002/0129374 A1 | 9/2002 | Freeman et al. |
| 2002/0140719 A1 | 10/2002 | Amir et al. |
| 2002/0144262 A1 | 10/2002 | Plotnick et al. |
| 2002/0174430 A1 | 11/2002 | Ellis et al. |
| 2002/0177914 A1 | 11/2002 | Chase |
| 2002/0194595 A1 | 12/2002 | Miller et al. |
| 2003/0007560 A1 | 1/2003 | Mayhew et al. |
| 2003/0012409 A1 | 1/2003 | Overton et al. |
| 2003/0020744 A1 | 1/2003 | Ellis et al. |
| 2003/0023757 A1 | 1/2003 | Ishioka et al. |
| 2003/0039471 A1 | 2/2003 | Hashimoto |
| 2003/0069057 A1 | 4/2003 | DeFrees-Parrott |
| 2003/0076347 A1 | 4/2003 | Barrett et al. |
| 2003/0101164 A1 | 5/2003 | Pic et al. |
| 2003/0148806 A1 | 8/2003 | Weiss |
| 2003/0159566 A1 | 8/2003 | Sater et al. |
| 2003/0183064 A1 | 10/2003 | Eugene et al. |
| 2003/0184598 A1 | 10/2003 | Graham |
| 2003/0221541 A1 | 12/2003 | Platt |
| 2004/0009813 A1 | 1/2004 | Wind |
| 2004/0019905 A1 | 1/2004 | Fellenstein et al. |
| 2004/0034711 A1 | 2/2004 | Hughes |
| 2004/0070595 A1 | 4/2004 | Atlas et al. |
| 2004/0091848 A1 | 5/2004 | Nemitz |
| 2004/0125124 A1 | 7/2004 | Kim et al. |
| 2004/0128317 A1 | 7/2004 | Sull et al. |
| 2004/0138948 A1 | 7/2004 | Loomis |
| 2004/0146275 A1 | 7/2004 | Takata et al. |
| 2004/0172476 A1 | 9/2004 | Chapweske |
| 2004/0194128 A1 | 9/2004 | McIntyre et al. |
| 2004/0194131 A1 | 9/2004 | Ellis et al. |
| 2004/0199923 A1 | 10/2004 | Russek |
| 2004/0261127 A1 | 12/2004 | Freeman et al. |

(56) References Cited

U.S. PATENT DOCUMENTS

| | | |
|---|---|---|
| 2005/0019015 A1 | 1/2005 | Ackley et al. |
| 2005/0055377 A1 | 3/2005 | Dorey et al. |
| 2005/0091597 A1 | 4/2005 | Ackley |
| 2005/0102707 A1 | 5/2005 | Schnitman |
| 2005/0107159 A1 | 5/2005 | Sato |
| 2005/0120389 A1 | 6/2005 | Boss et al. |
| 2005/0132401 A1 | 6/2005 | Boccon-Gibod et al. |
| 2005/0166224 A1 | 7/2005 | Ficco |
| 2005/0198661 A1 | 9/2005 | Collins et al. |
| 2005/0210145 A1 | 9/2005 | Kim et al. |
| 2005/0251820 A1 | 11/2005 | Stefanik et al. |
| 2005/0251827 A1 | 11/2005 | Ellis et al. |
| 2006/0002895 A1 | 1/2006 | McDonnell et al. |
| 2006/0024034 A1 | 2/2006 | Filo et al. |
| 2006/0028951 A1 | 2/2006 | Tozun et al. |
| 2006/0064733 A1 | 3/2006 | Norton et al. |
| 2006/0080167 A1 | 4/2006 | Chen et al. |
| 2006/0120624 A1 | 6/2006 | Jojic et al. |
| 2006/0150072 A1 | 7/2006 | Salvucci |
| 2006/0150216 A1 | 7/2006 | Herz et al. |
| 2006/0153537 A1 | 7/2006 | Kaneko et al. |
| 2006/0155400 A1 | 7/2006 | Loomis |
| 2006/0200842 A1 | 9/2006 | Chapman et al. |
| 2006/0222322 A1 | 10/2006 | Levitan |
| 2006/0224260 A1 | 10/2006 | Hicken et al. |
| 2006/0253330 A1 | 11/2006 | Maggio et al. |
| 2006/0274828 A1 | 12/2006 | Siemens et al. |
| 2007/0003149 A1 | 1/2007 | Nagumo et al. |
| 2007/0024706 A1 | 2/2007 | Brannon et al. |
| 2007/0033633 A1 | 2/2007 | Andrews et al. |
| 2007/0055989 A1 | 3/2007 | Shanks et al. |
| 2007/0079325 A1 | 4/2007 | de Heer |
| 2007/0085759 A1 | 4/2007 | Lee et al. |
| 2007/0099684 A1 | 5/2007 | Butterworth |
| 2007/0101369 A1 | 5/2007 | Dolph |
| 2007/0118801 A1 | 5/2007 | Harshbarger et al. |
| 2007/0154169 A1 | 7/2007 | Cordray et al. |
| 2007/0157234 A1 | 7/2007 | Walker |
| 2007/0157260 A1 | 7/2007 | Walker |
| 2007/0157261 A1 | 7/2007 | Steelberg et al. |
| 2007/0162395 A1 | 7/2007 | Ben-Yaacov et al. |
| 2007/0220583 A1 | 9/2007 | Bailey et al. |
| 2007/0226761 A1 | 9/2007 | Zalewski et al. |
| 2007/0239754 A1 | 10/2007 | Schnitman |
| 2007/0253677 A1 | 11/2007 | Wang |
| 2007/0253688 A1 | 11/2007 | Koennecke |
| 2007/0263722 A1 | 11/2007 | Fukuzawa |
| 2008/0019445 A1 | 1/2008 | Aono et al. |
| 2008/0021187 A1 | 1/2008 | Wescott et al. |
| 2008/0021874 A1 | 1/2008 | Dahl et al. |
| 2008/0022320 A1 | 1/2008 | Ver Steeg |
| 2008/0031595 A1 | 2/2008 | Cho |
| 2008/0086456 A1 | 4/2008 | Rasanen et al. |
| 2008/0086754 A1 | 4/2008 | Chen et al. |
| 2008/0091721 A1 | 4/2008 | Harboe et al. |
| 2008/0092159 A1 | 4/2008 | Dmitriev et al. |
| 2008/0148152 A1 | 6/2008 | Blinnikka et al. |
| 2008/0161111 A1 | 7/2008 | Schuman |
| 2008/0170687 A1 | 7/2008 | Moors et al. |
| 2008/0177893 A1 | 7/2008 | Bowra et al. |
| 2008/0178232 A1 | 7/2008 | Velusamy |
| 2008/0276157 A1 | 11/2008 | Kustka et al. |
| 2008/0300967 A1 | 12/2008 | Buckley et al. |
| 2008/0301750 A1 | 12/2008 | Silfvast et al. |
| 2008/0314232 A1 | 12/2008 | Hansson et al. |
| 2009/0022015 A1 | 1/2009 | Harrison |
| 2009/0022165 A1 | 1/2009 | Candelore et al. |
| 2009/0024923 A1 | 1/2009 | Hartwig et al. |
| 2009/0029771 A1 | 1/2009 | Donahue |
| 2009/0055880 A1 | 2/2009 | Batteram et al. |
| 2009/0063681 A1 | 3/2009 | Ramakrishnan et al. |
| 2009/0063995 A1 | 3/2009 | Baron et al. |
| 2009/0077137 A1 | 3/2009 | Weda et al. |
| 2009/0079663 A1 | 3/2009 | Chang et al. |
| 2009/0083631 A1 | 3/2009 | Sidi et al. |
| 2009/0116817 A1 | 5/2009 | Kim et al. |
| 2009/0177538 A1 | 7/2009 | Brewer et al. |
| 2009/0178089 A1 | 7/2009 | Picco et al. |
| 2009/0191971 A1 | 7/2009 | Avent |
| 2009/0195652 A1 | 8/2009 | Gal |
| 2009/0199697 A1 | 8/2009 | Lehtinieml et al. |
| 2009/0226046 A1 | 9/2009 | Shteyn |
| 2009/0228572 A1 | 9/2009 | Wall et al. |
| 2009/0254827 A1 | 10/2009 | Gonze et al. |
| 2009/0258708 A1 | 10/2009 | Figueroa |
| 2009/0265737 A1 | 10/2009 | Issa et al. |
| 2009/0265746 A1 | 10/2009 | Halen et al. |
| 2009/0297118 A1 | 12/2009 | Fink et al. |
| 2009/0320075 A1 | 12/2009 | Marko |
| 2010/0017820 A1 | 1/2010 | Thevathasan et al. |
| 2010/0042496 A1 | 2/2010 | Wang et al. |
| 2010/0050083 A1 | 2/2010 | Axen et al. |
| 2010/0069159 A1 | 3/2010 | Yamada et al. |
| 2010/0070987 A1 | 3/2010 | Amento et al. |
| 2010/0077290 A1 | 3/2010 | Pueyo |
| 2010/0088726 A1 | 4/2010 | Curtis et al. |
| 2010/0122286 A1 | 5/2010 | Begeja et al. |
| 2010/0146145 A1 | 6/2010 | Tippin et al. |
| 2010/0153512 A1 | 6/2010 | Balassanian et al. |
| 2010/0153885 A1 | 6/2010 | Yates |
| 2010/0161792 A1 | 6/2010 | Palm et al. |
| 2010/0162344 A1 | 6/2010 | Casagrande et al. |
| 2010/0167816 A1 | 7/2010 | Perlman et al. |
| 2010/0167819 A1 | 7/2010 | Schell |
| 2010/0186032 A1 | 7/2010 | Pradeep et al. |
| 2010/0186579 A1 | 7/2010 | Schnitman |
| 2010/0199299 A1 | 8/2010 | Chang et al. |
| 2010/0210351 A1 | 8/2010 | Berman |
| 2010/0251295 A1 | 9/2010 | Amento et al. |
| 2010/0262336 A1 | 10/2010 | Rivas et al. |
| 2010/0267450 A1 | 10/2010 | McMain |
| 2010/0268361 A1 | 10/2010 | Mantel et al. |
| 2010/0278509 A1 | 11/2010 | Nagano et al. |
| 2010/0287033 A1 | 11/2010 | Mathur |
| 2010/0287475 A1 | 11/2010 | van Zwol et al. |
| 2010/0293455 A1 | 11/2010 | Bloch |
| 2010/0325135 A1 | 12/2010 | Chen et al. |
| 2010/0332404 A1 | 12/2010 | Valin |
| 2011/0000797 A1 | 1/2011 | Henry |
| 2011/0007797 A1 | 1/2011 | Palmer et al. |
| 2011/0010742 A1 | 1/2011 | White |
| 2011/0026898 A1 | 2/2011 | Lussier et al. |
| 2011/0033167 A1 | 2/2011 | Arling et al. |
| 2011/0041059 A1 | 2/2011 | Amarasingham et al. |
| 2011/0069940 A1 | 3/2011 | Shimy et al. |
| 2011/0078023 A1 | 3/2011 | Aldrey et al. |
| 2011/0078740 A1 | 3/2011 | Bolyukh et al. |
| 2011/0096225 A1 | 4/2011 | Candelore |
| 2011/0126106 A1 | 5/2011 | Ben Shaul et al. |
| 2011/0131493 A1 | 6/2011 | Dahl |
| 2011/0138331 A1 | 6/2011 | Pugsley et al. |
| 2011/0163969 A1 | 7/2011 | Anzures et al. |
| 2011/0169603 A1 | 7/2011 | Fithian et al. |
| 2011/0182366 A1 | 7/2011 | Frojdh et al. |
| 2011/0191684 A1 | 8/2011 | Greenberg |
| 2011/0191801 A1 | 8/2011 | Vytheeswaran |
| 2011/0193982 A1 | 8/2011 | Kook et al. |
| 2011/0197131 A1 | 8/2011 | Duffin et al. |
| 2011/0200116 A1 | 8/2011 | Bloch et al. |
| 2011/0202562 A1 | 8/2011 | Bloch et al. |
| 2011/0238494 A1 | 9/2011 | Park |
| 2011/0239246 A1 | 9/2011 | Woodward et al. |
| 2011/0246661 A1 | 10/2011 | Manzari et al. |
| 2011/0246885 A1 | 10/2011 | Pantos et al. |
| 2011/0252320 A1 | 10/2011 | Arrasvuori et al. |
| 2011/0264755 A1 | 10/2011 | Salvatore De Villiers |
| 2011/0282745 A1 | 11/2011 | Meoded et al. |
| 2011/0282906 A1 | 11/2011 | Wong |
| 2011/0307786 A1 | 12/2011 | Shuster |
| 2011/0307919 A1 | 12/2011 | Weerasinghe |
| 2011/0307920 A1 | 12/2011 | Blanchard et al. |
| 2011/0313859 A1 | 12/2011 | Stillwell et al. |
| 2011/0314030 A1 | 12/2011 | Burba et al. |
| 2012/0004960 A1 | 1/2012 | Ma et al. |

(56) References Cited

U.S. PATENT DOCUMENTS

| | | |
|---|---|---|
| 2012/0005287 A1 | 1/2012 | Gadel et al. |
| 2012/0011438 A1 | 1/2012 | Kim et al. |
| 2012/0017141 A1 | 1/2012 | Eelen et al. |
| 2012/0062576 A1 | 3/2012 | Rosenthal et al. |
| 2012/0081389 A1 | 4/2012 | Dilts |
| 2012/0089911 A1 | 4/2012 | Hosking et al. |
| 2012/0094768 A1 | 4/2012 | McCaddon et al. |
| 2012/0105723 A1 | 5/2012 | Van Coppenolle et al. |
| 2012/0110618 A1 | 5/2012 | Kilar et al. |
| 2012/0110620 A1 | 5/2012 | Kilar et al. |
| 2012/0120114 A1 | 5/2012 | You et al. |
| 2012/0134646 A1 | 5/2012 | Alexander |
| 2012/0137015 A1 | 5/2012 | Sun |
| 2012/0147954 A1 | 6/2012 | Kasai et al. |
| 2012/0159541 A1 | 6/2012 | Carton et al. |
| 2012/0179970 A1 | 7/2012 | Hayes |
| 2012/0198412 A1 | 8/2012 | Creighton et al. |
| 2012/0198489 A1* | 8/2012 | O'Connell ............ G06Q 30/06 725/14 |
| 2012/0213495 A1 | 8/2012 | Hafeneger et al. |
| 2012/0225693 A1 | 9/2012 | Sirpal et al. |
| 2012/0233631 A1 | 9/2012 | Geshwind |
| 2012/0246032 A1 | 9/2012 | Beroukhim et al. |
| 2012/0263263 A1 | 10/2012 | Olsen et al. |
| 2012/0308206 A1 | 12/2012 | Kulas |
| 2012/0317198 A1 | 12/2012 | Patton et al. |
| 2012/0324491 A1 | 12/2012 | Bathiche et al. |
| 2013/0021269 A1 | 1/2013 | Johnson et al. |
| 2013/0024888 A1 | 1/2013 | Sivertsen |
| 2013/0028446 A1 | 1/2013 | Krzyzanowski |
| 2013/0028573 A1 | 1/2013 | Hoofien et al. |
| 2013/0031582 A1 | 1/2013 | Tinsman et al. |
| 2013/0033542 A1 | 2/2013 | Nakazawa |
| 2013/0036200 A1 | 2/2013 | Roberts et al. |
| 2013/0039632 A1 | 2/2013 | Feinson |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0061263 A1 | 3/2013 | Issa et al. |
| 2013/0094830 A1 | 4/2013 | Stone et al. |
| 2013/0097643 A1 | 4/2013 | Stone et al. |
| 2013/0117248 A1 | 5/2013 | Bhogal et al. |
| 2013/0125181 A1 | 5/2013 | Montemayor et al. |
| 2013/0129304 A1 | 5/2013 | Feinson |
| 2013/0129308 A1 | 5/2013 | Karn et al. |
| 2013/0173765 A1 | 7/2013 | Korbecki |
| 2013/0177294 A1 | 7/2013 | Kennberg |
| 2013/0188923 A1 | 7/2013 | Hartley et al. |
| 2013/0202265 A1 | 8/2013 | Arrasvuori et al. |
| 2013/0204710 A1 | 8/2013 | Boland et al. |
| 2013/0219425 A1 | 8/2013 | Swartz |
| 2013/0235152 A1 | 9/2013 | Hannuksela et al. |
| 2013/0235270 A1 | 9/2013 | Sasaki et al. |
| 2013/0254292 A1 | 9/2013 | Bradley |
| 2013/0259442 A1 | 10/2013 | Bloch et al. |
| 2013/0282917 A1 | 10/2013 | Reznik et al. |
| 2013/0290818 A1 | 10/2013 | Arrasvuori et al. |
| 2013/0298146 A1 | 11/2013 | Conrad et al. |
| 2013/0308926 A1 | 11/2013 | Jang et al. |
| 2013/0328888 A1 | 12/2013 | Beaver et al. |
| 2013/0330055 A1 | 12/2013 | Zimmermann et al. |
| 2013/0335427 A1 | 12/2013 | Cheung et al. |
| 2014/0015940 A1 | 1/2014 | Yoshida |
| 2014/0019865 A1 | 1/2014 | Shah |
| 2014/0025620 A1 | 1/2014 | Greenzeiger et al. |
| 2014/0025839 A1 | 1/2014 | Marko et al. |
| 2014/0040273 A1 | 2/2014 | Cooper et al. |
| 2014/0040280 A1 | 2/2014 | Slaney et al. |
| 2014/0046946 A2 | 2/2014 | Friedmann et al. |
| 2014/0078397 A1 | 3/2014 | Bloch et al. |
| 2014/0082666 A1 | 3/2014 | Bloch et al. |
| 2014/0085196 A1 | 3/2014 | Zucker et al. |
| 2014/0086445 A1 | 3/2014 | Brubeck et al. |
| 2014/0094313 A1 | 4/2014 | Watson et al. |
| 2014/0101550 A1 | 4/2014 | Zises |
| 2014/0105420 A1 | 4/2014 | Lee |
| 2014/0126877 A1 | 5/2014 | Crawford et al. |
| 2014/0129618 A1 | 5/2014 | Panje et al. |
| 2014/0136186 A1 | 5/2014 | Adami et al. |
| 2014/0152564 A1 | 6/2014 | Gulezian et al. |
| 2014/0156677 A1 | 6/2014 | Collins, III et al. |
| 2014/0178051 A1 | 6/2014 | Bloch et al. |
| 2014/0186008 A1 | 7/2014 | Eyer |
| 2014/0194211 A1 | 7/2014 | Chimes et al. |
| 2014/0210860 A1 | 7/2014 | Caissy |
| 2014/0219630 A1 | 8/2014 | Minder |
| 2014/0220535 A1 | 8/2014 | Angelone |
| 2014/0237520 A1 | 8/2014 | Rothschild et al. |
| 2014/0245152 A1 | 8/2014 | Carter et al. |
| 2014/0270680 A1 | 9/2014 | Bloch et al. |
| 2014/0279032 A1 | 9/2014 | Roever et al. |
| 2014/0282013 A1 | 9/2014 | Amijee |
| 2014/0282642 A1 | 9/2014 | Needham et al. |
| 2014/0298173 A1 | 10/2014 | Rock |
| 2014/0314239 A1 | 10/2014 | Meyer et al. |
| 2014/0380167 A1 | 12/2014 | Bloch et al. |
| 2015/0007234 A1 | 1/2015 | Rasanen et al. |
| 2015/0012369 A1 | 1/2015 | Dharmaji et al. |
| 2015/0015789 A1 | 1/2015 | Guntur et al. |
| 2015/0020086 A1 | 1/2015 | Chen et al. |
| 2015/0033266 A1 | 1/2015 | Klappert et al. |
| 2015/0046946 A1 | 2/2015 | Hassell et al. |
| 2015/0058342 A1 | 2/2015 | Kim et al. |
| 2015/0063781 A1 | 3/2015 | Silverman et al. |
| 2015/0067596 A1 | 3/2015 | Brown et al. |
| 2015/0067723 A1 | 3/2015 | Bloch et al. |
| 2015/0070458 A1 | 3/2015 | Kim et al. |
| 2015/0104155 A1 | 4/2015 | Bloch et al. |
| 2015/0106845 A1 | 4/2015 | Popkiewicz et al. |
| 2015/0124171 A1 | 5/2015 | King |
| 2015/0154439 A1 | 6/2015 | Anzue et al. |
| 2015/0160853 A1 | 6/2015 | Hwang et al. |
| 2015/0179224 A1 | 6/2015 | Bloch et al. |
| 2015/0181271 A1 | 6/2015 | Onno et al. |
| 2015/0181301 A1 | 6/2015 | Bloch et al. |
| 2015/0185965 A1 | 7/2015 | Belliveau et al. |
| 2015/0195601 A1 | 7/2015 | Hahm |
| 2015/0199116 A1 | 7/2015 | Bloch et al. |
| 2015/0201187 A1 | 7/2015 | Ryo |
| 2015/0256861 A1 | 9/2015 | Oyman |
| 2015/0258454 A1 | 9/2015 | King et al. |
| 2015/0293675 A1 | 10/2015 | Bloch et al. |
| 2015/0294685 A1 | 10/2015 | Bloch et al. |
| 2015/0304698 A1 | 10/2015 | Redol |
| 2015/0318018 A1 | 11/2015 | Kaiser et al. |
| 2015/0331485 A1 | 11/2015 | Wilairat et al. |
| 2015/0331933 A1 | 11/2015 | Tocchini, IV et al. |
| 2015/0331942 A1 | 11/2015 | Tan |
| 2015/0348325 A1 | 12/2015 | Voss |
| 2016/0009487 A1 | 1/2016 | Edwards et al. |
| 2016/0021412 A1 | 1/2016 | Zito, Jr. |
| 2016/0037217 A1 | 2/2016 | Harmon et al. |
| 2016/0057497 A1 | 2/2016 | Kim et al. |
| 2016/0062540 A1 | 3/2016 | Yang et al. |
| 2016/0065831 A1 | 3/2016 | Howard et al. |
| 2016/0066051 A1 | 3/2016 | Caidar et al. |
| 2016/0086585 A1 | 3/2016 | Sugimoto |
| 2016/0094875 A1 | 3/2016 | Peterson et al. |
| 2016/0099024 A1 | 4/2016 | Gilley |
| 2016/0100226 A1 | 4/2016 | Sadler et al. |
| 2016/0104513 A1 | 4/2016 | Bloch et al. |
| 2016/0105724 A1 | 4/2016 | Bloch et al. |
| 2016/0132203 A1 | 5/2016 | Seto et al. |
| 2016/0142889 A1 | 5/2016 | O'Connor et al. |
| 2016/0162179 A1 | 6/2016 | Annett et al. |
| 2016/0170948 A1 | 6/2016 | Bloch |
| 2016/0173944 A1 | 6/2016 | Kilar et al. |
| 2016/0192009 A1 | 6/2016 | Sugio et al. |
| 2016/0217829 A1 | 7/2016 | Bloch et al. |
| 2016/0224573 A1 | 8/2016 | Shahraray et al. |
| 2016/0232579 A1 | 8/2016 | Fahnestock |
| 2016/0277779 A1 | 9/2016 | Zhang et al. |
| 2016/0303608 A1 | 10/2016 | Jossick |
| 2016/0321689 A1* | 11/2016 | Turgeman .......... G06Q 30/0248 |

(56) References Cited

U.S. PATENT DOCUMENTS

| | | | |
|---|---|---|---|
| 2016/0322054 A1 | 11/2016 | Bloch et al. | |
| 2016/0323608 A1 | 11/2016 | Bloch et al. | |
| 2016/0337691 A1 | 11/2016 | Prasad et al. | |
| 2016/0365117 A1 | 12/2016 | Boliek et al. | |
| 2016/0366454 A1 | 12/2016 | Tatourian et al. | |
| 2017/0006322 A1 | 1/2017 | Dury et al. | |
| 2017/0041372 A1 | 2/2017 | Hosur | |
| 2017/0062012 A1 | 3/2017 | Bloch et al. | |
| 2017/0142486 A1 | 5/2017 | Masuda | |
| 2017/0178409 A1 | 6/2017 | Bloch et al. | |
| 2017/0178601 A1 | 6/2017 | Bloch et al. | |
| 2017/0195736 A1 | 7/2017 | Chai et al. | |
| 2017/0264920 A1 | 9/2017 | Mickelsen | |
| 2017/0286424 A1 | 10/2017 | Peterson | |
| 2017/0289220 A1 | 10/2017 | Bloch et al. | |
| 2017/0295410 A1 | 10/2017 | Bloch et al. | |
| 2017/0326462 A1* | 11/2017 | Lyons | G07F 17/3293 |
| 2017/0337196 A1 | 11/2017 | Goela et al. | |
| 2017/0345460 A1 | 11/2017 | Bloch et al. | |
| 2018/0007443 A1 | 1/2018 | Cannistraro et al. | |
| 2018/0014049 A1 | 1/2018 | Griffin et al. | |
| 2018/0025078 A1 | 1/2018 | Quennesson | |
| 2018/0048831 A1 | 2/2018 | Berwick et al. | |
| 2018/0068019 A1 | 3/2018 | Novikoff et al. | |
| 2018/0115592 A1 | 4/2018 | Samineni | |
| 2018/0130501 A1 | 5/2018 | Bloch et al. | |
| 2018/0176573 A1 | 6/2018 | Chawla et al. | |
| 2018/0191574 A1 | 7/2018 | Vishnia et al. | |
| 2018/0254067 A1 | 9/2018 | Elder | |
| 2018/0262798 A1 | 9/2018 | Ramachandra | |
| 2018/0314959 A1 | 11/2018 | Apokatanidis et al. | |
| 2019/0069038 A1 | 2/2019 | Phillips | |
| 2019/0069039 A1 | 2/2019 | Phillips | |
| 2019/0075367 A1 | 3/2019 | Van Zessen et al. | |
| 2019/0090002 A1 | 3/2019 | Ramadorai et al. | |
| 2019/0098371 A1* | 3/2019 | Keesan | H04N 21/25883 |
| 2019/0132639 A1 | 5/2019 | Panchaksharaiah et al. | |
| 2019/0166412 A1 | 5/2019 | Panchaksharaiah et al. | |
| 2019/0182525 A1 | 6/2019 | Steinberg et al. | |
| 2019/0238719 A1 | 8/2019 | Alameh et al. | |
| 2019/0335225 A1 | 10/2019 | Fang et al. | |
| 2019/0354936 A1 | 11/2019 | Deluca et al. | |
| 2020/0023157 A1 | 1/2020 | Lewis et al. | |
| 2020/0037047 A1* | 1/2020 | Cheung | H04N 21/8545 |
| 2020/0344508 A1 | 10/2020 | Edwards et al. | |

FOREIGN PATENT DOCUMENTS

| | | |
|---|---|---|
| DE | 10053720 A1 | 4/2002 |
| EP | 0965371 A2 | 12/1999 |
| EP | 1033157 A2 | 9/2000 |
| EP | 2104105 A1 | 9/2009 |
| GB | 2359916 A | 9/2001 |
| GB | 2428329 A | 1/2007 |
| JP | 2003-245471 A | 9/2003 |
| JP | 2008-005288 A | 1/2008 |
| KR | 2004-0005068 A | 1/2004 |
| KR | 2010-0037413 A | 4/2010 |
| WO | WO-1996/013810 A1 | 5/1996 |
| WO | WO-2000/059224 A1 | 10/2000 |
| WO | WO-2007/062223 A2 | 5/2007 |
| WO | WO-2007/138546 A2 | 12/2007 |
| WO | WO-2008/001350 A2 | 1/2008 |
| WO | WO-2008/052009 A2 | 5/2008 |
| WO | WO-2008/057444 A2 | 5/2008 |
| WO | WO-2009/125404 A2 | 10/2009 |
| WO | WO-2009/137919 A1 | 11/2009 |

OTHER PUBLICATIONS

U.S. Appl. No. 14/884,285 Published as US2017/0178601, Systems and Method for Assembling a Recorded Composition, filed Oct. 15, 2015.

U.S. Appl. No. 13/639,795 U.S. Pat. No. 10,474,334 Published as US2015/0199116, Progress Bar for Branched Videos, filed Mar. 5, 2015.

U.S. Appl. No. 13/921,536 U.S. Pat. No. 9,832,516 Published as US2014/0380167, Systems and Methods for Multiple Device Interaction with Selectably Presentable Media Streams, filed Jun. 19, 2013.

U.S. Appl. No. 14/107,600 U.S. Pat. No. 10,448,119 Published as US2015/0067723, Methods and Systems for Unfolding Video Pre-Roll, filed Dec. 16, 2013.

U.S. Appl. No. 15/356,913, Systems and Methods for Real-Time Pixel Switching, filed Nov. 21, 2016.

U.S. Appl. No. 16/752,193, Systems and Methods for Nonlinear Video Playback Using Linear Real-Time Video Players, filed Jan. 24, 2020.

U.S. Appl. No. 16/ 559,082 Published as US2019/0392868, Systems and Methods for Adaptive and Responsive Video, filed Sep. 3, 2019.

U.S. Appl. No. 14/978,491 Published as US2017/0178409, Seamless Transitions in Large-Scale Video, filed Dec. 22, 2015.

U.S. Appl. No. 15/395,477 Published as US2018/0191574, Systems and Methods for Dynamic Weighting of Branched Video Paths, filed Dec. 30, 2016.

U.S. Appl. No. 16/283,066, Dynamic Library Display for Interactive Videos, filed Feb. 22, 2019.

U.S. Appl. No. 12/706,721, now U.S. Pat. No. 9,190,110, the Office Actions dated Apr. 26, 2012, Aug. 17, 2012, Mar. 28, 2013, Jun. 20, 2013, Jan. 3, 2014, Jul. 7, 2014, and Dec. 19, 2014; the Notices of Allowance dated Jun. 19, 2015, Jul. 17, 2015, Jul. 29, 2015, Aug. 12, 2015, and Sep. 14, 2015.

U.S. Appl. No. 14/884,284, the Office Actions dated Sep. 8, 2017; May 18, 2018; Dec. 14, 2018; Jul. 25, 2019; Nov. 18, 2019 and Feb. 21, 2020.

U.S. Appl. No. 13/033,916, now U.S. Pat. No. 9,607,655, the Office Actions dated Jun. 7, 2013, Jan. 2, 2014, Aug. 28, 2014, Jan. 5, 2015, Jul. 9, 2015, and Jan. 5, 2016; the Advisory Action dated May 11, 2016; and the Notice of Allowance dated Dec. 21, 2016.

U.S. Appl. No. 13/034,645, the Office Actions dated Jul. 23, 2012, Mar. 21, 2013, Sep. 15, 2014, Jun. 4, 2015, Apr. 7, 2017, Oct. 6, 2017, Aug. 10, 2018, Jul. 5, 2016, Apr. 5, 2019 and Dec. 26, 2019.

U.S. Appl. No. 13/437,164, now U.S. Pat. No. 8,600,220, the Notice of Allowance dated Aug. 9, 2013.

U.S. Appl. No. 14/069,694, now U.S. Pat. No. 9,271,015, the Office Actions dated Apr. 27, 2015 and Aug. 31, 2015, the Notice of Allowance dated Oct. 13, 2015.

U.S. Appl. No. 13/622,780, now U.S. Pat. No. 8,860,882, the Office Action dated Jan. 16, 2014, the Notice of Allowance dated Aug. 4, 2014.

U.S. Appl. No. 13/622,795, now U.S. Pat. No. 9,009,619, the Office Actions dated May 23, 2014 and Dec. 1, 2014, the Notice of Allowance dated Jan. 9, 2015.

U.S. Appl. No. 14/639,579, now U.S. Pat. No. 10,474,334, the Office Actions dated May 3, 2017, Nov. 22, 2017 and Jun. 26, 2018, the Notices of Allowance dated Feb. 8, 2019 and Jul. 11, 2019.

U.S. Appl. No. 13/838,830, now U.S. Pat. No. 9,257,148, the Office Action dated May 7, 2015, Notices of Allowance dated Nov. 6, 2015.

U.S. Appl. No. 14/984,821, now U.S. Pat. No. 10,418,066, the Office Actions dated Jun. 1, 2017, Dec. 6, 2017, and Oct. 5, 2018; the Notice of Allowance dated May 7, 2019.

U.S. Appl. No. 13/921,536, now U.S. Pat. No. 9,832,516, the Office Actions dated Feb. 25, 2015, Oct. 20, 2015, Aug. 26, 2016 and Mar. 8, 2017, the Advisory Action dated Jun. 21, 2017, and Notice of Allowance dated Sep. 12, 2017.

U.S. Appl. No. 14/107,600, now U.S. Pat. No. 10,448,119, the Office Actions dated Dec. 19, 2014, Jul. 8, 2015, Jun. 3, 2016, Mar. 8, 2017, Oct. 10, 2017 and Jul. 25, 2018, and the Notices of Allowance dated Dec. 31, 2018 and Apr. 25, 2019.

U.S. Appl. No. 14/335,381, now U.S. Pat. No. 9,530,454, the Office Action dated Feb. 12, 2016; and the Notice of Allowance dated Aug. 24, 2016.

U.S. Appl. No. 14/139,996, now U.S. Pat. No. 9,641,898, the Office Actions dated Jun. 18, 2015, Feb. 3, 2016 and May 4, 2016; and the Notice of Allowance dated Dec. 23, 2016.

(56) References Cited

OTHER PUBLICATIONS

U.S. Appl. No. 14/140,007, now U.S. Pat. No. 9,520,155, the Office Actions dated Sep. 8, 2015 and Apr. 26, 2016; and the Notice of Allowance dated Oct. 11, 2016.
U.S. Appl. No. 14/249,627, now U.S. Pat. No. 9,653,115, the Office Actions dated Jan. 14, 2016 and Aug. 9, 2016; and the Notice of Allowance dated Jan. 13, 2017.
U.S. Appl. No. 15/481,916, the Office Actions dated Oct. 6, 2017, Aug. 6, 2018, Mar. 8, 2019, Nov. 27, 2019, and the Notice of Allowance dated Apr. 21, 2020.
U.S. Appl. No. 14/249,665, now U.S. Pat. No. 9,792,026, the Office Actions dated May 16, 2016 and Feb. 22, 2017; and the Notices of Allowance dated Jun. 2, 2017 and Jul. 24, 2017.
U.S. Appl. No. 14/509,700, now U.S. Pat. No. 9,792,957, the Office Action dated Oct. 28, 2016; and the Notice of Allowance dated Jun. 15, 2017.
U.S. Appl. No. 15/703,462, the Office Action dated Jun. 21, 2019, and Dec. 27, 2019; and the Notice of Allowance dated Feb. 10, 2020.
U.S. Appl. No. 14/534,626, the Office Actions dated Nov. 25, 2015, Jul. 5, 2016, Jun. 5, 2017, Mar. 2, 2018, Sep. 26, 2018, May 8, 2019 and Dec. 27, 2019.
U.S. Appl. No. 14/700,845, now U.S. Pat. No. 9,653,115, the Office Actions dated May 20, 2016, Dec. 2, 2016, May 22, 2017, Nov. 28, 2017, Jun. 27, 2018 and Feb. 19, 2019 and the Notice of Allowance dated Oct. 21, 2019.
U.S. Appl. No. 14/700,862, now U.S. Pat. No. 9,672,868, the Office Action dated Aug. 26, 2016; and the Notice of Allowance dated Mar. 9, 2017.
U.S. Appl. No. 14/835,857, now U.S. Pat. No. 10,460,765, the Office Actions dated Sep. 23, 2016, Jun. 5, 2017 and Aug. 9, 2018, and the Advisory Action dated Oct. 20, 2017; Notice of Allowances dated Feb. 25, 2019 and Jun. 7, 2019.
U.S. Appl. No. 16/559,082, the Office Action dated Feb. 2, 2020.
U.S. Appl. No. 16/800,994, the Office Action dated Apr. 15, 2020.
U.S. Appl. No. 14/978,464, the Office Actions dated Jul. 25, 2019, Dec. 14, 2018, May 18, 2018, Sep. 8, 2017, Dec. 14, 2018, Jul. 25, 2019, and Nov. 18, 2019.
U.S. Appl. No. 14/978,491, the Office Actions dated Sep. 8, 2017, May 25, 2018, Dec. 14, 2018, Aug. 12, 2019 and Dec. 23, 2019.
U.S. Appl. No. 15/085,209, now U.S. Pat. No. 10,462,202, the Office Actions dated Feb. 26, 2018 and Dec. 31, 2018; the Notice of Allowance dated Aug. 12, 2019.
U.S. Appl. No. 15/165,373, the Office Actions dated Mar. 24, 2017, Oct. 11, 2017, May 18, 2018; Feb. 1, 2019, Aug. 8, 2019, and Jan. 3, 2020.
U.S. Appl. No. 15/189,931, now U.S. Pat. No. 10,218,760, the Office Actions dated Apr. 6, 2018, Notice of Allowance dated Oct. 24, 2018.
U.S. Appl. No. 15/395,477, the Office Actions dated Nov. 2, 2018, Aug. 16, 2019, and Apr. 15, 2019.
U.S. Appl. No. 15/997,284, the Office Actions dated Aug. 1, 2019, Nov. 21, 2019 and Apr. 28, 2020.
U.S. Appl. No. 15/863,191, now U.S. Pat. No. 10/257,578, the Notices of Allowance dated Jul. 5, 2018 and Nov. 23, 2018.
U.S. Appl. No. 16/283,066, the Office Action dated Jan. 6, 2020.
U.S. Appl. No. 16/591,103, the Office Action dated Apr. 22, 2020.
An ffmpeg and SDL Tutorial, "Tutorial 05: Synching Video," Retrieved from internet on Mar. 15, 2013: <http://dranger.com/ffmpeg/tutorial05.html>, (4 pages).
Archos Gen 5 English User Manual Version 3.0, Jul. 26, 2007, pp. 1-81.
Bartlett, "iTunes 11: Howto Queue Next Song," Technipages, Oct. 6, 2008, pp. 1-8, Retrieved from the Internet on Dec. 26, 2013, http://www.technipages.com/itunes-queue-next-song.html.
Gregor Miller et al. "MiniDiver: A Novel Mobile Media Playback Interface for Rich Video Content on an iPhoneTM", Entertainment Computing A ICEC 2009, Septembers, 2009, pp. 98-109.

International Search Report and Written Opinion for International Patent Application PCT/IB2013/001000 dated Jul. 31, 2013 (12 pages).
International Search Report for International Patent Application PCT/IL2010/000362 dated Aug. 25, 2010 (2 pages).
International Search Report for International Patent Application PCT/IL2012/000080 dated Aug. 9, 2012 (4 pages).
International Search Report for International Patent Application PCT/IL2012/000081 dated Jun. 28, 2012 (4 pages).
Labs.byHook: "Ogg Vorbis Encoder for Flash: Alchemy Series Part 1," [Online] Internet Article, Retrieved on Jun. 14, 2012 from the Internet: URL:http://labs.byhook.com/2011/02/15/ogg-vorbis-encoder-for-flash-alchemy-series-part-1/, 2011, (pp. 1-8).
Sodagar, I., (2011) "The MPEG-DASH Standard for Multimedia Streaming Over the Internet", IEEE Multimedia, IEEE Service Center, New York, NY US, vol. 18, No. 4, pp. 62-67.
Supplemental European Search Report for EP10774637.2 (PCT/IL2010/000362) dated Jun. 28, 2012 (6 pages).
Supplemental European Search Report for EP13184145 dated Jan. 30, 2014 (6 pages).
Yang, H, et al., "Time Stamp Synchronization In Video Systems," Teletronics Technology Corporation, <http://www.ttcdas.com/products/daus_encoders/pdf/_tech_papers/tp_2010_tIme_stamp_video_system.pdf>, Abstract, (8 pages).
U.S. Appl. No. 12/706,721 U.S. Pat. No. 9,190,110 Published as US2010/0293455, System and Method for Assembling a Recorded Composition, filed Feb. 17, 2010.
U.S. Appl. No. 14/884,3285 Published as US2017/0178601, Systems and Method for Assembling a Recorded Composition, filed Oct. 15, 2015.
U.S. Appl. No. 13/033,916 U.S. Pat. No. 9,607,655 Published as US2011/0200116, System and Method for Seamless Multimedia Assembly, filed Feb. 24, 2011.
U.S. Appl. No. 13/034,645 Published as US2011/0202562, System and Method for Data Mining Within Interactive Multimedia, filed Feb. 24, 2011.
U.S. Appl. No. 13/437,164 U.S. Pat. No. 8,600,220 Published as US2013/0259442, Systems and Methods for Loading More Than One Video Content at a Time, filed Apr. 2, 2012.
U.S. Appl. No. 14/069,694 U.S. Pat. No. 9,271,015 Published as US2014/0178051, Systems and Methods for Loading More Than One Video Content at a Time, filed Nov. 1, 2013.
U.S. Appl. No. 13/622,780 U.S. Pat. No. 8,860,882 Published as US2014/0078397, Systems and Methods for Constructing Multimedia Content Modules, filed Sep. 19, 2012.
U.S. Appl. No. 13/622,795 U.S. Pat. No. 9,009,619 Published as US2014/0082666, Progress Bar for Branched Videos, filed Sep. 19, 2012.
U.S. Appl. No. 14/639,579 U.S. Pat. No. 10,747,334 Published as US2015/0199116, Progress Bar for Branched Videos, filed Mar. 5, 2015.
U.S. Appl. No. 13/838,830 U.S. Pat. No. 9,257,148 Published as US2014/0270680, System and Method for Synchronization of Selectably Presentable Media Streams, filed Mar. 15, 2013.
U.S. Appl. No. 14/984,821 U.S. Pat. No. 10,418,066 Published as US2016/0217829, System and Method for Synchronization of Selectably Presentable Media Streams, filed Dec. 30, 2015.
U.S. Appl. No. 13/921,536 U.S. Pat. No. 9,832,516 Published as U82014/0380167, Systems and Methods for Multiple Device Interaction with Selectably Presentable Media Streams, filed Jun. 19, 2013.
U.S. Appl. No. 14/107,600 U.S. Pat. No. 10,448,119 Published as US2015/0067723, Methods and Systems for Unfolding Video Pro-Roll, filed Dec. 16, 2013.
U.S. Appl. No. 14/335,381 U.S. Pat. No. 9,530,454 Published as US2015/0104155, Systems and Methods for Real-Time Pixel Switching, filed Jul. 18, 2014.
U.S. Appl. No. 14/139,996 U.S. Pat. No. 9,641,898 Published as US2015/0181301, Methods and Systems for In-Video Library, filed Dec. 24, 2013.
U.S. Appl. No. 14/140,007 U.S. Pat. No. 9,520,155 Published as US2015/0179224, Methods and Systems for Seeking to Non-Key Frames, filed Dec. 24, 2013.

(56) References Cited

OTHER PUBLICATIONS

U.S. Appl. No. 14/249,627 U.S. Pat. No. 9,653,115 Published as US 2015-0294685, Systems and Methods for Creating Linear Video From Branched Video, filed Apr. 10, 2014.
U.S. Appl. No. 15/481,916 Published as US 2017-0345460, Systems and Methods for Creating Linear Video From Branched Video, filed Apr. 7, 2017.
U.S. Appl. No. 16/986,977 Published as US 2020/0365187, Systems and Methods for Creating Linear Video From Branched Video, filed Aug. 6, 2020.
U.S. Appl. No. 14/249,665 U.S. Pat. No. 9,792,026 Published as US2015/0293675, Dynamic Timeline for Branched Video, filed Apr. 10, 2014.
U.S. Appl. No. 14/509,700 U.S. Pat. No. 9,792,957 Published as US2016/0104513, Systems and Methods for Dynamic Video Bookmarking, filed Oct. 8, 2014.
U.S. Appl. No. 14/534,626 Published as US-2018-0130501-A1, Systems and Methods for Dynamic Video Bookmarking, filed Sep. 13, 2017.
U.S. Appl. No. 16/865,896, Systems and Methods for Dynamic Video Bookmarking, filed May 4, 2020.
U.S. Appl. No. 17/138,434, Systems and Methods for Dynamic Video Bookmarking, filed Dec. 30, 2020.
U.S. Appl. No. 14/534,626 Published as US2016/0105724, Systems and Methods for Parallel Track Transitions, filed Nov. 6, 2014.
U.S. Appl. No. 14/700,845 U.S. Pat. No. 10,582,265 Published as US2016/0323608, Systems and Methods for Nonlinear Video Playback Using Linear Real-Time Video Players, filed Apr. 30, 2015.
U.S. Appl. No. 16/752,193 Published as US2020/0404382, Systems and Methods for Nonlinear Video Playback Using Linear Real-Time Video Players, filed Jan. 24, 2020.
U.S. Appl. No. 14/700,862 U.S. Pat. No. 9,672,868 Published as US2016/0322054, Systems and Methods for Seamless Media Creation, filed Apr. 30, 2015.
U.S. Appl. No. 14/835,857 U.S. Pat. No. 10,460,765 Published as US2017/0062012, Systems and Methods for Adaptive and Responsive Video, filed Aug. 26, 2015.
U.S. Appl. No. 16/559,082, Systems and Methods for Adaptive and Responsive Video, filed Sep. 3, 2019.
U.S. Appl. No. 16/800,994, Systems and Methods for Adaptive and Responsive Video, filed Feb. 25, 2020.
U.S. Appl. No. 14/978,464 Published as US2017/0178601, Intelligent Buffering of Large-Scale Video, filed Dec. 22, 2015.
U.S. Appl. No. 14/978,491 U.S. Pat. No. 11,128,853 Published as US2017/0178409, Seamless Transitions In Large-Scale Video, filed Dec. 22, 2015.
U.S. Appl. No. 17/403,703, Seamless Transitions In Large-Scale Video, filed Aug. 16, 2021.
U.S. Appl. No. 15/085,209 U.S. Pat. No. 10,462,202 Published as US2017/0289220, Media Stream Rate Synchronization, filed Mar. 30, 2016.
U.S. Appl. No. 15/165,373 Published as US 2017-0295410, Symbiotic Interactive Video, filed May 26, 2016.
U.S. Appl. No. 15/189,931 U.S. Pat. No. 10,218,760 Published as US 2017/0374120, Dynamic Summary Generation for Real-time Switchable Videos, filed Jun. 22, 2016.
U.S. Appl. No. 15/395,477 U.S. Pat. No. 11,050,809 Published as US 2018/0191574, Systems and Methods for Dynamic Weighting of Branched Video Paths, filed Dec. 30, 2016.
U.S. Appl. No. 17/328,261, Systems and Methods for Dynamic Weighting of Branched Video Paths, filed May 24, 2021.
U.S. Appl. No. 15/997,284 Published as US 2019/0373330, Interactive Video Dynamic Adaptation and User Profiling, filed Jun. 4, 2018.
U.S. Appl. No. 15/863,191 U.S. Pat. No. 10,257,578, Dynamic Library Display for Interactive Videos, filed Jan. 5, 2018.
U.S. Appl. No. 16/283,066 U.S. Pat. No. 10,856,049 Published as US2019/0349637, Dynamic Library Display for Interactive Videos, filed Feb. 22, 2019.
U.S. Appl. No. 17/091,149, Dynamic Library Display for Interactive Videos, filed Nov. 6, 2020.
U.S. Appl. No. 16/591,103, Systems and Methods for Dynamically Adjusting Video Aspect Ratios, filed Oct. 2, 2019.
U.S. Appl. No. 16/793,205, Dynamic Adaptation of Interactive Video Players Using Behavioral Analytics, filed Feb. 18, 2020.
U.S. Appl. No. 16/922,540, Systems and Methods for Seamless Audio and Video Endpoint Transitions, filed Jul. 7, 2020.
U.S. Appl. No. 17/462,199, Shader-Based Dynamic Video Manipulation, filed Aug. 31, 2021.
U.S. Appl. No. 17/462,222, Shader-Based Dynamic Video Manipulation, filed Aug. 31, 2021.
U.S. Appl. No. 17/334,027, Automated Platform for Generating Interactive Videos, filed May 28, 2021.
Google Scholar search, "Inserting metadata inertion advertising video", Jul. 16, 2021, 2 pages.
International Preliminary Report and Written Opinion of PCT/IL2012/000080 dated Aug. 27, 2013, 7 pages.
International Search Report of PCT/IL2012/000080 dated Aug. 9, 2012, 4 pages.

* cited by examiner

| eventsequence | usertime | event | action | os | browser | currentnodename | interactionelementname |
|---|---|---|---|---|---|---|---|
| 1 | 1/5/2019 0:28 | in:sessionStart | | MacOS | Chrome | | |
| 2 | 1/5/2019 0:28 | in:sessionFrame | | MacOS | Chrome | | |
| 3 | 1/5/2019 0:28 | in:domLoadStart | | MacOS | Chrome | | |
| 4 | 1/5/2019 0:28 | in:session-data | | MacOS | Chrome | | |
| 5 | 1/5/2019 0:28 | in:projectStart | | MacOS | Chrome | | |
| 6 | 1/5/2019 0:28 | in:perfTimingL0 | | MacOS | Chrome | | |
| 7 | 1/5/2019 0:28 | in:message | cover:display | MacOS | Chrome | | |
| 8 | 1/5/2019 0:28 | in:view | | MacOS | Chrome | node_open_cred | |
| 9 | 1/5/2019 0:28 | in:videoSegment | start | MacOS | Chrome | node_open_cred | |
| 10 | 1/5/2019 0:28 | in:videoSegment | end | MacOS | Chrome | node_open_cred | |
| 11 | 1/5/2019 0:28 | in:videoSegment | start | MacOS | Chrome | node_7_1_hotel_wake | |
| 12 | 1/5/2019 0:28 | in:domLoadComplete | | MacOS | Chrome | | |
| 13 | 1/5/2019 0:29 | in:controlBarEvent | saving | MacOS | Chrome | node_7_1_hotel_wake | |
| 14 | 1/5/2019 0:29 | in:interaction | | MacOS | Chrome | node_7_1_hotel_wake | node_7_1_b_blink |
| 15 | 1/5/2019 0:29 | in:videoSegment | start | MacOS | Chrome | node_7_1_b_blink | |
| 16 | 1/5/2019 0:29 | in:interaction | | MacOS | Chrome | node_7_1_b_blink | node_7_1_c_title_a |

FIG. 4

SYSTEM AND METHODS FOR DETECTING ANOMALOUS ACTIVITIES FOR INTERACTIVE VIDEOS

FIELD OF THE INVENTION

The present disclosure relates generally to audiovisual presentations and data analytics, more particularly, to systems and methods for dynamically modifying the components of a media player based on analyzed interactions with interactive videos and identifying anomalous activity occurring with respect to interactive media.

BACKGROUND

The universe of digital streaming media is constantly evolving. Users frequently consume streaming media on their devices through streaming music services, video providers, social networks, and other media providers. Interactive streaming multimedia content, though less common, is also available. Many existing forms of interactive videos allow a viewer to make choices on how to proceed through predefined video paths; however, this functionality is accomplished using separate video segments that are quickly transitioned to upon selection, resulting in a noticeable disconnect in audio and video between consecutive segments. Further still, existing media players fail to account for numerous events associated with active user interactions with videos, as well as passive data that may be collected. There is no way to adequately adapt the components of media players based on these events and data. Further, to date, suitable techniques are lacking for identifying anomalous or fraudulent activity with respect to the specialized case of interactive media.

SUMMARY

In one aspect, a computer-implemented method comprises receiving an interactive video defined by a tree structure, the tree structure comprising a plurality of branches of the interactive video, each branch comprising one or more video segments; during a first playthrough of the interactive video using a video player, tracking information comprising user interactions with the interactive video; and in association with a second, later playthrough of the interactive video, dynamically modifying, based on the information, the video player and content of the interactive video. Other aspects of the foregoing include corresponding systems and computer programs on non-transitory storage media.

In various implementations, the information can further comprise decisions of a user made during the playthrough of the interactive video, the decisions being associated with a plurality of branching points in the tree structure; environment information associated with a viewer of the interactive video or a device on which the video player executes, the environment information comprising: location, IP address, demographic, referrer, tracking data, device type, browser properties, screen size, and/or bandwidth; behavioral information associated with user engagement with the interactive video, the behavioral information comprising number of interactions with the interactive video, timing of interactions with the interactive video, locations of interactions in the tree structure, occurrence of seeks, and occurrence of replays; and experience information associated with the first playthrough of the interactive video, the experience information comprising: expected buffering based on bandwidth, conformance of the first playthrough to the tree structure, expected device behavior, expected browser behavior, and/or reported errors.

In one implementation, dynamically modifying the video player and content of the interactive video comprises: creating a model of user behavior based on the behavioral information; identifying a behavioral pattern using the model; and modifying the video player and/or content of the interactive video based on the behavioral pattern. In another implementation, dynamically modifying the video player comprises automatically modifying at least one parameter of the video player to address a problem identified based on the experience information. The parameters of the video player can include video frame rate, video bitrate, audio bitrate, screen orientation, minimum buffer to play, scaling, video dimensions, starting node of interactive content, and/or default nodes at branching points in interactive content. In a further implementation, dynamically modifying content of the interactive video comprises (i) preloading video segments in the tree structure likely to be viewed by a user, or (ii) decreasing the prevalence of video content likely to be skipped by a user.

In another implementation, the method further comprises simulating a first playthrough of the interactive video in an emulated environment in which the video player has a parameter with a first value; and simulating a second playthrough of the interactive video in an emulated environment in which the video player has the parameter with a second, different value. Dynamically modifying the video player can include automatically setting the parameter to either the first value or the second value based on which of the first playthrough or the second playthrough exhibits fewer problems.

In another implementation, the method further comprises determining that the first playthrough of the interactive video results in more user engagements with the interactive video than a different playthrough of the interactive video, wherein dynamically modifying the video player and content of the interactive video comprises, in association with the second playthrough of the interactive video: (i) setting a value of a parameter of the video player equal to a value of a parameter of the video player in place at a time of the first playthrough, and/or (ii) selecting video segments for presentation during the second playthrough that correspond to video segments presented during the first playthrough.

In another implementation, the method further comprises dynamically modifying, for additional playthroughs of the interactive video that follow the first and second playthroughs, both the video player and content of the interactive video based on information tracked during one or more playthroughs of the interactive video that preceded each such additional playthrough.

In another aspect, a computer-implemented method comprises receiving an interactive video defined by a tree structure, the tree structure comprising a plurality of branches of the interactive video, each branch comprising one or more nodes having respective video segments; during a plurality of playthroughs of the interactive video to a user, tracking information associated with the playthroughs; and determining, based on the information, whether the user is likely to be a non-human user. Other aspects of the foregoing include corresponding systems and computer programs on non-transitory storage media.

Various implementations of the foregoing aspects can include the following features. Tracking information associated with the playthroughs can include determining that the user is not interacting with the interactive video. Tracking information associated with the playthroughs can include determining that the user interacts a same number of times with the interactive video during each of the playthroughs. Tracking information associated with the playthroughs can include determining that the user traverses a same branch of the tree structure during each of the playthroughs. Tracking information associated with the playthroughs can include determining that (i) the user interacts with a same node in the tree structure in each of the playthroughs and/or (ii) the user interacts with the interactive video at a same time in each of the playthroughs. Tracking information associated with the playthroughs can include identifying an existence of a plurality of sessions from the user within a particular time period. Tacking information associated with the playthroughs cam include determining that actions of the user with respect to the interactive video do not follow a random distribution.

In another implementation, determining whether the user is likely to be a non-human user comprises: attributing a score to each of a plurality of anomalous activity factors identified based on the information; and determining whether the user is likely to be a non-human user based on a combination of the scores. Determining whether the user is likely to be a non-human user can include determining whether behavioral information associated with user engagement with the interactive video is consistent with a model representing typical human user behavior. The user can be blocked from a further playthrough of the interactive video in response to determining that the user is likely a non-human user.

Further aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

FIG. 4 depicts example data relating to an interactive media presentation.

DETAILED DESCRIPTION

Described herein are various implementations of methods and supporting systems for collecting information associated with interactive videos (e.g. user behaviors, device data, etc.), analyzing the information, identifying anomalous or fraudulent activity, and dynamically adapting interactive video content and/or an interactive video application based on the analysis.

Figure 1:
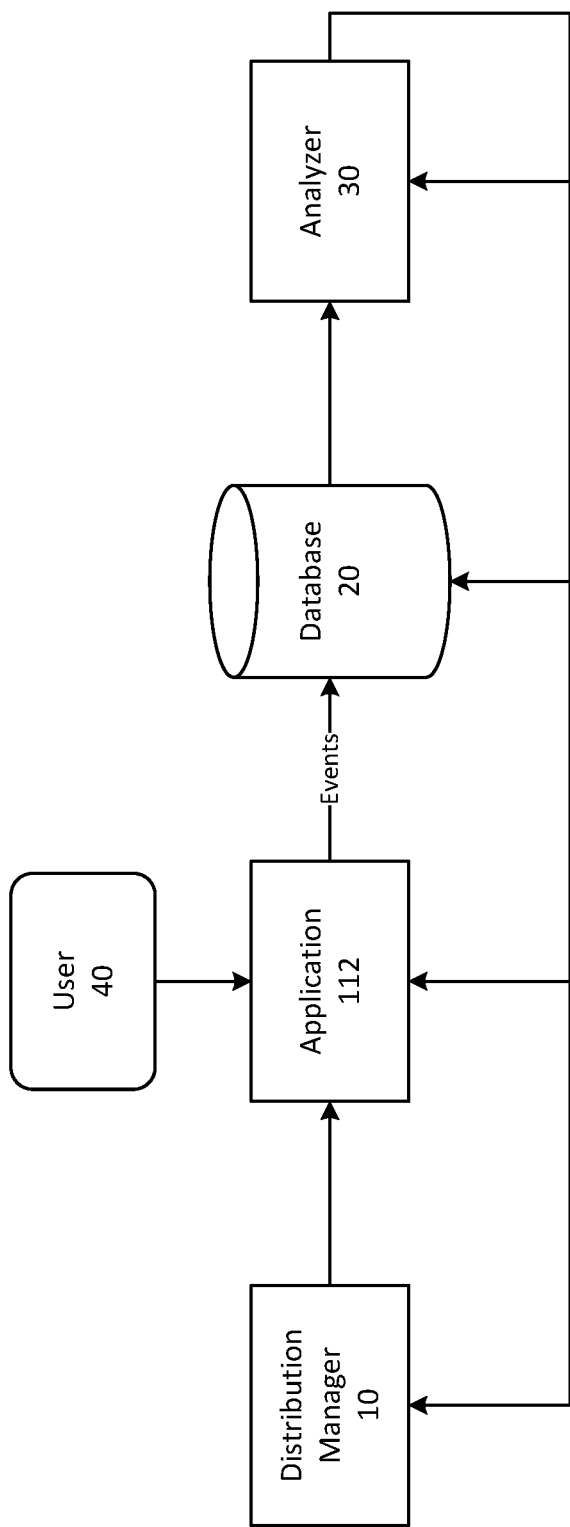
FIG. 1 depicts a high-level architecture of a system for dynamic adaptation of an interactive video player and content, and anomalous activity detection, according to an implementation.

FIG. 1 depicts a high-level architecture of such a system according to an implementation. The system includes application 112, which can be a video player and/or editor that is implemented as a native application, web application, or other form of software. In some implementations, the application 112 is in the form of a web page, widget, and/or Java, JavaScript, .Net, Silverlight, Flash, and/or other applet or plug-in that is downloaded to the user device 110 and runs in conjunction with a web browser. The application 112 and the web browser can be part of a single client-server interface; for example, the application 112 can be implemented as a plugin to the web browser or to another framework or operating system. Any other suitable client software architecture, including but not limited to widget frameworks and applet technology, can also be employed. User 40 can interact with application 112 (e.g., to view or edit an interactive video).

Distribution manager 10 is a software-based component used to configure parameters associated with advertising content to be shown to user 40 through application 112. For example, distribution manager 10 can be a browser-based dashboard interface used by marketing managers to set up the parameters of a marketing campaign, such as advertising budget, time period, associate ad content, and so on. In some implementations, distribution manager 10 is able to access analytics data collected by the system for use in targeting advertisements to users, such as user 40.

Database 20 includes one or more data stores that store events and other information collected by application 112 and/or processed by analyzer 30, as described further herein. Database 20 can be, for example, a relational or other structured database based on technological implementations including Oracle® MySQL, Oracle® Database, Microsoft® SQL Server, PostgreSQL, or IBM DB2.

Analyzer 30 accesses data collected by application 112 and stored in database 20, processes the data using set of rules, an artificial intelligence or machine learning model, or other suitable technique, and stores the results in database 20. The results can be made accessible to application 112 and can inform application 112 how to change the parameters of application 112 or adapt content played by application 112. In some implementations, the results include fraud indicators. For example, based on the data collected by application 112, analyzer 30 can identify the existence of anomalous activity by user 40, determine that user 40 is likely a non-human user (e.g., bot), and store this finding in database 20. Application 112, on identifying an attempt by user 40 to further interact with application 112, can look up user 40 in database 20, note the fraud indicator, and block the attempt.

Figure 2:
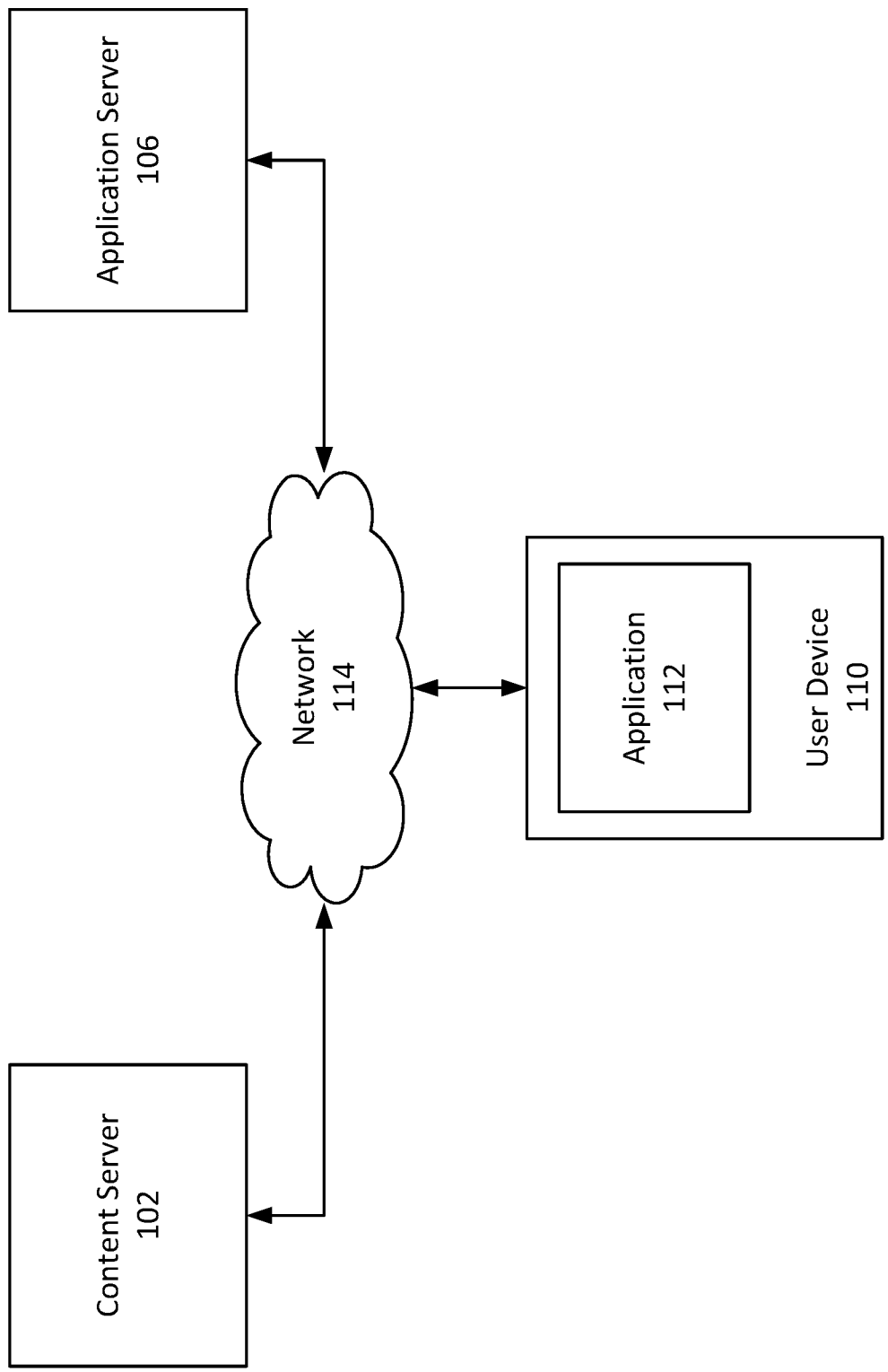
FIG. 2 depicts a high-level architecture of a system for providing interactive video content, according to an implementation.

FIG. 2 depicts an example high-level architecture in which application 112 executes on a user device 110 and receives a media presentation. Such a media presentation can include multiple video and/or audio streams can be presented to a user on the user device 110, with application 112 capable of playing and/or editing the content. The user device 110 can be, for example, a smartphone, tablet, laptop, desktop, palmtop, television, gaming device, virtual reality headset, smart glasses, smart watch, music player, mobile telephone, workstation, or other computing device configured to execute the functionality described herein. The user device 110 can have output functionality (e.g., display monitor, touchscreen, image projector, etc.) and input functionality (e.g., touchscreen, keyboard, mouse, remote control, etc.).

Media content can be provided to the user device 110 by content server 102, which can be a web server, media server, a node in a content delivery network, or other content source. In some implementations, the application 112 (or a portion thereof) is provided by application server 106. For example, some or all of the described functionality of the application 112 can be implemented in software downloaded to or existing on the user device 110 and, in some instances, some or all of the functionality exists remotely. For example, certain video encoding and processing functions can be performed on one or more remote servers, such as application server 106. In some implementations, the user device 110 serves only to provide output and input functionality, with the remainder of the processes being performed remotely.

The user device 110, content server 102, application server 106, and/or other devices and servers can communicate with each other through communications network 114. The communication can take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network 114 can carry TCP/IP protocol communications and HTTP/HTTPS requests made by a web browser, and the connection between clients and servers can be communicated over such TCP/IP networks. The type of network is not a limitation, however, and any suitable network can be used.

More generally, the techniques described herein can be implemented in any suitable hardware or software. If implemented as software, the processes can execute on a system capable of running one or more custom operating systems or commercial operating systems such as the Microsoft Windows® operating systems, the Apple OS X® operating systems, the Apple iOS® platform, the Google Android™ platform, the Linux® operating system and other variants of UNIX® operating systems, and the like. The software can be implemented a computer including a processing unit, a system memory, and a system bus that couples various system components including the system memory to the processing unit.

The system can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

The media presentations referred to herein can be structured in various forms. For example, a particular media presentation can be an online streaming video having multiple tracks or streams that a user can switch among in real-time or near real-time. For example, a media presentation can be structured using parallel audio and/or video tracks as described in U.S. Patent Application Pub. No. 2016/0105724, published on Apr. 14, 2016, and entitled "Systems and Methods for Parallel Track Transitions," the entirety of which is incorporated by reference herein. More specifically, a playing video file or stream can have one or more parallel tracks that can be switched among in real-time automatically and/or based on user interactions. In some implementations, such switches are made seamlessly and substantially instantaneously, such that the audio and/or video of the playing content can continue without any perceptible delays, gaps, or buffering. In further implementations, switches among tracks maintain temporal continuity; that is, the tracks can be synchronized to a common timeline so that there is continuity in audio and/or video content when switching from one track to another (e.g., the same song is played using different instruments on different audio tracks; same storyline performed by different characters on different video tracks, and the like).

Such media presentations can also include interactive video structured in a video tree, hierarchy, or other form. A video tree can be formed by nodes that are connected in a branching, hierarchical, or other linked form. Nodes can each have an associated video segment, audio segment, graphical user interface (GUI) elements, and/or other associated media. Users (e.g., viewers) can watch a video that begins from a starting node in the tree and proceeds along connected nodes in a branch or path. Upon reaching a point during playback of the video where multiple video segments (child nodes) branch off from a segment (parent node), the user can interactively select the branch or path to traverse and, thus, the next video segment to watch.

As referred to herein, a particular branch or path in an interactive media structure, such as a video tree, can refer to a set of consecutively linked nodes between a starting node and ending node, inclusively, or can refer to some or all possible linked nodes that are connected subsequent to (e.g., sub-branches) or that include a particular node. Branched video can include seamlessly assembled and selectably presentable multimedia content such as that described in U.S. Patent Application Pub. No. 2011/0200116, published on Aug. 18, 2011, and entitled "System and Method for Seamless Multimedia Assembly", and U.S. Patent Application Pub. No. 2015/0067723, published on Mar. 5, 2015, and entitled "Methods and Systems for Unfolding Video Pre-Roll," the entireties of which are hereby incorporated by reference.

The prerecorded video segments in a video tree or other structure can be selectably presentable multimedia content; that is, some or all of the video segments in the video tree can be individually or collectively played for a user based upon the user's selection of a particular video segment, an interaction with a previous or playing video segment, or other interaction that results in a particular video segment or segments being played. The video segments can include, for example, one or more predefined, separate multimedia content segments that can be combined in various manners to create a continuous, seamless presentation such that there are no noticeable gaps, jumps, freezes, delays, or other visual or audible interruptions to video or audio playback between segments. In addition to the foregoing, "seamless" can refer to a continuous playback of content that gives the user the appearance of watching a single, linear multimedia presentation, as well as a continuous playback of multiple content segments that have smooth audio and/or video transitions (e.g., fadeout/fade-in, linking segments) between two or more of the segments.

In some instances, the user is permitted to make choices or otherwise interact in real-time at decision points or during decision periods interspersed throughout the multimedia content. Decision points and/or decision periods can occur at any time and in any number during a multimedia segment, including at or near the beginning and/or the end of the segment. Decision points and/or periods can be predefined, occurring at fixed points or during fixed periods in the multimedia content segments. Based at least in part on the user's choices made before or during playback of content, one or more subsequent multimedia segment(s) associated with the choices can be presented to the user. In some implementations, the subsequent segment is played immediately and automatically following the conclusion of the current segment, whereas in other implementations, the subsequent segment is played immediately upon the user's interaction with the video, without waiting for the end of the decision period or the end of the segment itself.

If a user does not make a selection at a decision point or during a decision period, a default, previously identified selection, or random selection can be made by the system. In some instances, the user is not provided with options; rather, the system automatically selects the segments that will be shown based on information that is associated with the user, other users, or other factors, such as the current date. For example, the system can automatically select subsequent segments based on the user's IP address, location, time zone, the weather in the user's location, social networking ID, saved selections, stored user profiles (as further described below), preferred products or services, and so on. The system can also automatically select segments based on previous selections made by other users, such as the most popular suggestion or shared selections. The information can also be displayed to the user in the video, e.g., to show the user why an automatic selection is made. As one example, video segments can be automatically selected for presentation based on the geographical location of three different users: a user in Canada will see a twenty-second beer commercial segment followed by an interview segment with a Canadian citizen; a user in the US will see the same beer commercial segment followed by an interview segment with a US citizen; and a user in France is shown only the beer commercial segment.

Multimedia segment(s) selected automatically or by a user can be presented immediately following a currently playing segment, or can be shown after other segments are played. Further, the selected multimedia segment(s) can be presented to the user immediately after selection, after a fixed or random delay, at the end of a decision period, and/or at the end of the currently playing segment. Two or more combined segments can form a seamless multimedia content path or branch, and users can take multiple paths over multiple playthroughs, and experience different complete, start-to-finish, seamless presentations. Further, one or more multimedia segments can be shared among intertwining paths while still ensuring a seamless transition from a previous segment and to the next segment. The content paths can be predefined, with fixed sets of possible transitions in order to ensure seamless transitions among segments. The content paths can also be partially or wholly undefined, such that, in some or all instances, the user can switch to any known video segment without limitation. There can be any number of predefined paths, each having any number of predefined multimedia segments. Some or all of the segments can have the same or different playback lengths, including segments branching from a single source segment.

Traversal of the nodes along a content path in a tree can be performed by selecting among options that appear on and/or around the video while the video is playing. In some implementations, these options are presented to users at a decision point and/or during a decision period in a content segment. Some or all of the displayed options can hover and then disappear when the decision period ends or when an option has been selected. Further, a timer, countdown or other visual, aural, or other sensory indicator can be presented during playback of content segment to inform the user of the point by which he should (or, in some cases, must) make his selection. For example, the countdown can indicate when the decision period will end, which can be at a different time than when the currently playing segment will end. If a decision period ends before the end of a particular segment, the remaining portion of the segment can serve as a non-interactive seamless transition to one or more other segments. Further, during this non-interactive end portion, the next multimedia content segment (and other potential next segments) can be downloaded and buffered in the background for later playback (or potential playback).

A segment that is played after (immediately after or otherwise) a currently playing segment can be determined based on an option selected or other interaction with the video. Each available option can result in a different video and audio segment being played. As previously mentioned, the transition to the next segment can occur immediately upon selection, at the end of the current segment, or at some other predefined or random point. Notably, the transition between content segments can be seamless. In other words, the audio and video continue playing regardless of whether a segment selection is made, and no noticeable gaps appear in audio or video playback between any connecting segments. In some instances, the video continues on to another segment after a certain amount of time if none is chosen, or can continue playing in a loop.

In one example, the multimedia content is a music video in which the user selects options upon reaching segment decision points to determine subsequent content to be played. First, a video introduction segment is played for the user. Prior to the end of the segment, a decision point is reached at which the user can select the next segment to be played from a listing of choices. In this case, the user is presented with a choice as to who will sing the first verse of the song: a tall, female performer, or a short, male performer. The user is given an amount of time to make a selection (i.e., a decision period), after which, if no selection is made, a default segment will be automatically selected. The default can be a predefined or random selection. Of note, the media content continues to play during the time the user is presented with the choices. Once a choice is selected (or the decision period ends), a seamless transition occurs to the next segment, meaning that the audio and video continue on to the next segment as if there were no break between the two segments and the user cannot visually or audibly detect the transition. As the music video continues, the user is presented with other choices at other decisions points, depending on which path of choices is followed. Ultimately, the user arrives at a final segment, having traversed a complete multimedia content path.

Figure 3:
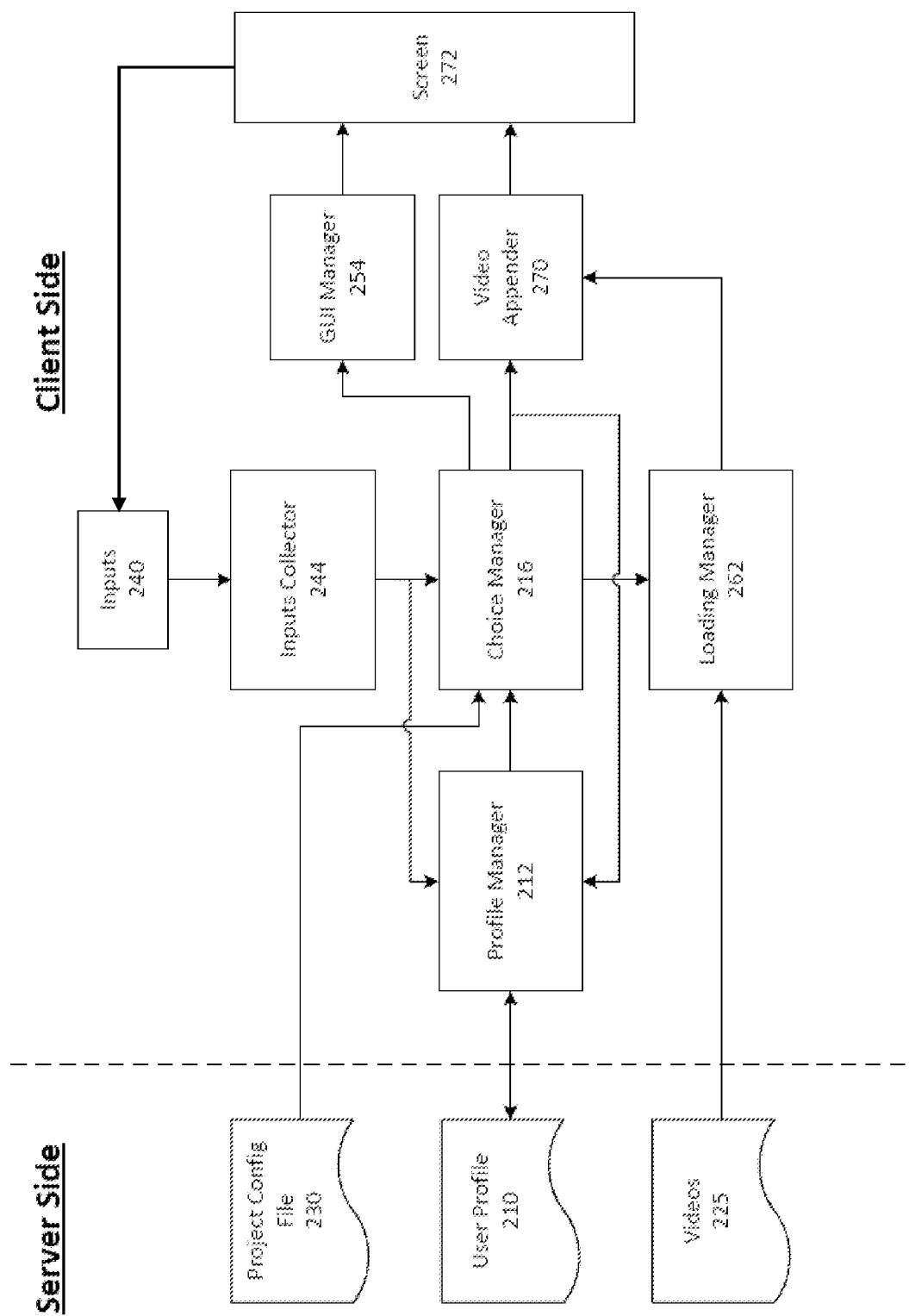
FIG. 3 depicts server-side and client-side components of an application for providing interactive video content, according to an implementation.

FIG. 3 depicts one implementation of a detailed architecture of client-side components in application 112 on user device 110, including inputs received from remote sources, such as content server 102 and application server 106. Client side components include Profile Manager 212, Choice Manager 216, Inputs Collector 244, GUI Manager 254, Loading Manager 262, and Video Appender 270. Profile Manager 212 receives user profile information from User Profile 210, which can exist locally on the client (user device 110) or, as depicted, be obtained externally from a remote server (e.g., content server 102 or application server 106). Profile Manager 212 can also provide information characterizing a user for storing back in User Profile 210. A different User Profile 210 can exist for each identifiable viewer of a media presentation, with each user identified by a unique ID and/or identification technique (e.g., a cookie stored locally on the user's device). Default user profile information can be provided when a viewer is anonymous or cannot otherwise be identified.

User Profile 210 can include information collected through a user's interaction with an interactive video and an interactive media player, as well as information obtained from other sources (e.g., detected location of user's device, information made available through a user's social media account, information provided by the user when creating an account with a provider of the interactive media player, and so on). Profile Manager 212 can use the information in User Profile 210 to cause the presentation of an interactive video to be dynamically modified, e.g., by adapting choices and content presented to the user to the user's previous or current behavior, or otherwise changing the presentation of the interactive video from its default state. For example, based on information in User Profile 210, Profile Manager 212 can direct Choice Manager 216 to select only a subset of choices (e.g., 2 of 3 choices) to provide to a viewer approaching a decision point, where Choice Manager 216 would otherwise provide a full set of choices (e.g., 3 of 3 choices) by default during presentation of the interactive video. Profile Manager 212 can also receive information from Inputs Collector 244 (this information can include, e.g., user interactions) and Choice Manager 216 (this information can include, e.g., a currently selected path in a video tree), which can be used to update User Profile 210. In some implementations, information in User Profile 210 can be used to modify the state of the interactive media player itself, as further described below.

Inputs Collector 244 receives user inputs 240 from input components such as a device display screen 272, keyboard, mouse, microphone, virtual reality headset, and the like. Such inputs 240 can include, for example, mouse clicks, keyboard presses, touchpad presses, eye movement, head movement, voice input, etc. Inputs Collector 244 provides input information based on the inputs 240 to Profile Manager 212 and Choice Manager 216, the latter of which also receives information from Profile Manager 212 as well as a Project Configuration File 230 to determine which video segment should be currently played and which video segments may be played or presented as options to be played at a later time (e.g., influenced by information from the User Profile 210). Choice Manager 216 notifies Video Appender 270 of the video segment to be currently played, and Video Appender 270 seamlessly connects that video segment to the video stream being played in real time. Choice Manager 216 notifies Loading Manager 262 of the video segments that may be played or presented as options to be played at a later time.

Project Configuration File 230 can include information defining the media presentation, such as the video tree or other structure, and how video segments can be linked together in various manners to form one or more paths. Project Configuration File 230 can further specify which audio, video, and/or other media files correspond to each segment (e.g., node in a video tree), that is, which audio, video, and/or other media should be retrieved when application 112 determines that a particular segment should be played. Additionally, Project Configuration File 230 can indicate interface elements that should be displayed or otherwise presented to users, as well as when the elements should be displayed, such that the audio, video, and interactive elements of the media presentation are synchronized. Project Configuration File 230 can be stored on user device 110 or can be remotely accessed by Choice Manager 216.

In some implementations, Project Configuration File 230 is also used in determining which media files should be loaded or buffered prior to being played (or potentially played). Because decision points can occur near the end of a segment, it may be necessary to begin transferring one or more of the potential next segments to viewers prior to a selection being made. For example, if a viewer is approaching a decision point with three possible branches, all three potential next segments can be preloaded partially or fully to ensure a smooth transition upon conclusion of the current segment. Intelligent buffering and progressive downloading of the video, audio, and/or other media content can be performed as described in U.S. Patent Application Pub. No. 2013/0259442, published Oct. 3, 2013, and entitled "Systems and Methods for Loading More Than One Video Content at a Time," the entirety of which is incorporated by reference herein.

Using information in Project Configuration File 230, Choice Manager 216 can inform GUI Manager 254 of which interface elements should be displayed to viewers on screen 272. Project Configuration File 230 can further indicate the specific timings for which actions can be taken with respect to the interface elements (e.g., when a particular element is active and can be interacted with). The interface elements can include, for example, playback controls (pause, stop, play, seek, etc.), segment option selectors (e.g., buttons, images, text, animations, video thumbnails, and the like, that a viewer can interact with during decision periods, the selection of which results in a particular multimedia segment being seamlessly played following the conclusion of the current segment), timers (e.g., a clock or other graphical or textual countdown indicating the amount of time remaining to select an option or next segment, which, in some cases, can be the amount of time remaining until the current segment will transition to the next segment), links, popups, an index (e.g., for browsing and/or selecting other multimedia content to view or listen to), and/or a dynamic progress bar such as that described in U.S. Patent Application Pub. No. 2014/0082666, published Mar. 20, 2014, and entitled "Progress Bar for Branched Videos," the entirety of which is incorporated by reference herein. In addition to visual elements, sounds or other sensory elements can be presented. For example, a timer can have a "ticking" sound synchronized with the movement of a clock hand. The interactive interface elements can be shared among multimedia segments or can be unique to one or more of the segments.

In addition to reading information from Project Configuration File 230, Choice Manager 216 is notified of user interactions (e.g., mouse clicks, keyboard presses, touchpad presses, eye movements, etc.) from Inputs Collector 244, which interactions can be translated into actions associated with the playback of a media presentation (e.g., segment selections, playback controls, etc.). Based thereon, Choice Manager 216 notifies Loading Manager 262, which can process the actions as further described below. Choice Manager 216 can also interface with Loading Manager 262 and Video Appender 270. For example, Choice Manager 216 can listen for user interaction information from Inputs Collector 244 and notify Loading Manager 262 when an interaction by the viewer (e.g., a selection of an option displayed during the video) has occurred. In some implementations, based on its analysis of received events, Choice Manager 216 causes the presentation of various forms of sensory output, such as visual, aural, tactile, olfactory, and the like.

As earlier noted, Choice Manager 216 can also notify Loading Manager 262 of video segments that may be played at a later time, and Loading Manger 262 can retrieve the corresponding videos 225 (whether stored locally or on, e.g., content server 102) to have them prepared for potential playback through Video Appender 270. Choice Manager 216 and Loading Manager 262 can function to manage the downloading of hosted streaming media according to a loading logic. In one implementation, Choice Manager 216 receives information defining the media presentation structure from Project Configuration File 230 and, using information from Inputs Collector 244 and Profile Manager 212, determines which media segments to download and/or buffer (e.g., if the segments are remotely stored). For example, if Choice Manager 216 informs Loading Manager 262 that a particular segment A will or is likely to be played at an upcoming point in the presentation timeline, Loading Manager 262 can intelligently request the segment for download, as well as additional media segments X, Y and Z that can be played following segment A, in advance of playback or notification of potential playback thereof. The downloading can occur even if fewer than all of X, Y, Z will be played (e.g., if X, Y and Z are potential segment choices branching off segment A and only one will be selected for playback).

In some implementations, Loading Manager 262 ceases or cancels downloading of content segments or other media if it determines that it is no longer possible for a particular media content segment (or other content) to be presented on a currently traversed media path. Referring to the above example, a user interacts with the video presentation such that segment Y is determined to be the next segment that will be played. The interaction can be received by Choice Manager 216 and, based on its knowledge of the path structure of the video presentation, Loading Manager 262 is notified to stop active downloads or dequeue pending downloads of content segments no longer reachable now that segment Y has been selected.

Video Appender 270 receives media content from Loading Manager 262 and instructions from Choice Manager 216 on which media segments to include in a media presentation. Video Appender 270 can analyze and/or modify raw video or other media content, for example, to concatenate two separate media streams into a single timeline. Video Appender 270 can also insert cue points and other event markers, such as junction events, into media streams. Further, Video Appender 270 can form one or more streams of bytes from multiple video, audio or other media streams, and feed the formed streams to a video playback function such that there is seamless playback of the combined media content on display screen 272 (as well as through speakers for audio, for example).

In some implementations, application 112 tracks information regarding user interactions, users, and/or player devices, and stores the information in a database, such as database 20 in FIG. 1. Collected analytics can include, but are not limited to: (1) device information, such as number, type, brand, model, device location, operating system, installed software, browser, browser parameters, user agent string, screen size, bandwidth, and network connection parameters; (2) user tracking and demographic data, such as login information, name, address, age, sex, referrer, uniform resource locator (URL), urchin tracking module (UTM) parameters; (3) user or automated action information, such as button/touchpad presses, mouse clicks, mouse/touchpad movements, action timings, media player controls (play, pause, volume up/down, mute, full screen, minimize, seek forward, seek backward, etc.), link outs, shares, rates, comments; (4) information associated with interactions with interactive media content, such as decisions made by users or made automatically (e.g., content segment user choices or default selections), starting a node, ending a node, and content paths followed in the presentation content structure; and (5) information associated with media playback events and timing, such as loading events, buffering events, play and pause events. The analytics can include those described in U.S. Patent Application Pub. No. 2011/0202562, entitled "System and Method for Data Mining within Interactive Multimedia," and published Aug. 18, 2011, the entirety of which is incorporated by reference herein. In one instance, some or all of these analytics are included in or used to inform attributes in User Profile 210.

In one implementation, referring again to FIG. 1, analyzer 30 receives from database 20, as input data, a plurality of data vectors. Each data vector can include an organized set of data pertaining to a particular category. For instance, analyzer 30 can receive as input four data vectors: (1) static vector, which includes device information and user tracking and demographic data; (2) timing vector, which includes information associated with media playback events and timing; (3) actions vector, which includes user and automated action information; and (4) interactions vector, which includes information associated with interactions with interactive media content. FIG. 4 illustrates a simplified example of data (formatted for ease of interpretation) provided as input to the analyzer 30. The data represents a sequence of 16 events (numbered 1 through 16) occurring at the start of an interactive video playthrough. It is to be appreciated that the sequence of events represents a small subset of events in a typical playthrough, which may number in the tens, hundreds, or even thousands, depending on the complexity of the video and available interactions. In addition to the sequence number (eventsequence), each event includes an associated time of occurrence (usertime), type of event (event), action associated with the event, if any (action), operating system of the user viewing the video (os), web browser of the user viewing the video (browser), unique identifier of the node in the video tree associated with the event, if any (currentnodename), and unique name of the element (e.g., an interface element) associated with an interaction, if any (interactionelementname). Event types can include session start, interactive video project start, video segment (with associated start and end actions), interaction received, and so on.

In various implementations, analyzer 30 comprises one or more modules that each analyze data from database 20 in a different manner. Modules can incorporate artificial intelligence techniques for data analysis, such as machine learning processes. A module can initially incorporate a basic rule set that defines which action(s) to take in response to observed input data. The input data and corresponding resulting actions from applying the rule set can be used to train a machine learning model over time, in order to form a model that attempts to identify appropriate resulting actions based on various combinations of input data to which no predefined rules may apply. One of skill in the art will appreciate the numerous artificial intelligence techniques that can be used to analyze the types of input data described herein and, as a result, provide output specifying actions that can be taken with respect to, for example, a media player or interactive content, as further described below.

Analyzer 30 can include an experience checker and variables optimizer (ECVO) module. The ECVO module is configured to automatically detect errors and other issues with the interactive media experience by examining a set of input data, such as that received from database 20 and described above. Various techniques can be used to identify such errors and issues. For example, in one instance, the input data is compared against expected values to identify deviations. In another instance, the data is provided as input to a model that is trained to identify likely issues based on one or more of the input data values. Examples of potential experience issues to check based on available input data include (1) confirming that the user is experiencing no more than an expected amount of buffering based on the user's available bandwidth; (2) determining whether the path taken through an interactive media presentation corresponds to a possible path in a tree or other structure defining the paths of the presentation; (3) determining whether behaviors or characteristics exhibited by a user's device or browser correspond to expected behaviors or characteristics for the device or browser; (4) confirming that the presence and order of events is as expected (e.g., no missing, unexpected or duplicate events); (5) confirming that all expected fields in the input data are present and contain values in the expected format; and (6) identifying any error messages or reports. The ECVO module can format its findings, including any identified errors or issues, in a user friendly format (e.g., a table) and report them to distribution manager 10.

The ECVO module can attempt to resolve identified issues by taking responsive action. In one implementation, the ECVO module modifies parameters of the media player to test whether an issue is resolved. For example, based on data gathered over many playthroughs of an interactive video by different users, the ECVO module may learn that all plays on the Chrome browser in a low bandwidth condition result in a poor playback experience (e.g., too much buffering). To address this, the ECVO module causes the media player to be configured with a specific set of variables (e.g., limit the frame rate, use audio files with lower bitrate, use other lower quality assets, etc.) each time the same conditions (i.e., Chrome browser, low bandwidth) are detected. Other settings of the media player can be configured to address identified issues Such settings can include, for example, which video engine to use, minimum buffer to pay (e.g., minimum media content buffered in seconds before playback will commence), initial bitrate, scale (e.g., growth/shrink factor to apply to video, pan-and-scan, boxing), initial width of video content, initial height of video content, whether autoplay is activated, whether content starts in full screen mode, starting node for interactive media content, and default nodes at branching points in interactive media content.

To determine which combinations of media player variables work to create a good user experience (e.g., higher video and audio quality, minimal delays and buffering, faster responsiveness to interactions, etc.) under a particular set of conditions, the ECVO module can incorporate a video emulator that emulates the same playthrough of an interactive video using different player variables. For instance, the emulator can be configured to emulate an environment under which an identified issue is occurring. The emulated environment settings can include operating system, browser type, browser version, device type, bandwidth, and other relevant factors.

Figure 5:
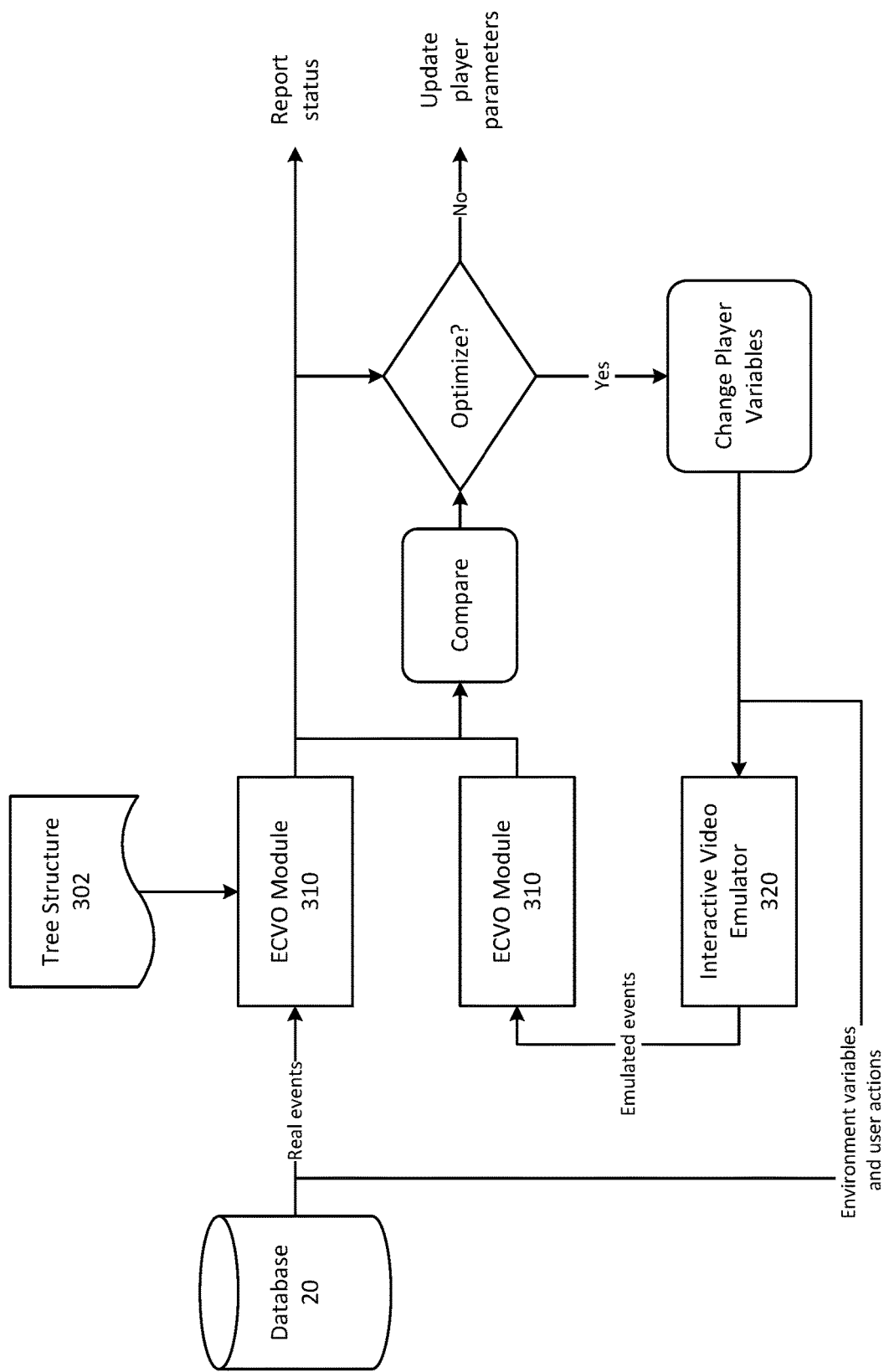
FIG. 5 depicts a process diagram for an interactive video emulator module, according to an implementation.

FIG. 5 depicts the interactions among the ECVO module 310 and the interactive video emulator 320. The ECVO module 310 receives various input data reflecting actual events and plays of the interactive video, as described above, from database 20. Further, the ECVO module 310 has access to the interactive video tree structure 302, which can be used to determine if the input data includes events inconsistent with the available paths and options defined by the tree structure 302. The interactive video emulator 320 configured to emulate a desired environment, and one or more variables for the emulated media player (such as those described above) are configured differently from the real world playback. Interactive video emulator 320 then simulates the playthrough of the interactive video, recreating a set of actions performed (e.g., the same actions performed by a user during a playthrough of an interactive video that exhibited an issue), as recorded in database 20. The simulated playthrough results in observed emulated event data, similar to real world data event that is collected during real world playthroughs of the interactive video.

The results of the real world playthrough and the emulated playthrough are compared to see if the issue has improved, worsened, or stayed the same. For example, the comparison may show that a delay in loading video segments has decreased from 500 ms to 200 ms, thereby improving. On identifying that an improvement has occurred, the emulation process can end, and the media player variables that led to the improvement can be saved and used to automatically configure media players in future playthroughs of the interactive video that are detected to be executing in the same or similar environment to that which was emulated. If no improvement occurs or the issue worsens, one or more variables of the emulated player are modified and the simulation is repeated. In some implementations, even if an improvement occurs, the emulation process can continue in an attempt to obtain further improvement (e.g., by incrementally modifying player variables that appear to result in a positive effect on the interactive video experience). Multiple simulations can be executed, each with a different combination of media player variables. Values for the player variables can be selected using a suitable technique, such as the application of a set of rules that outputs a variable value to change based on input issue (e.g., too much buffering), the use of a machine learning model trained to recommend changes in player variable values to produce a desired result, or random selections within a range of acceptable values.

Figure 6:
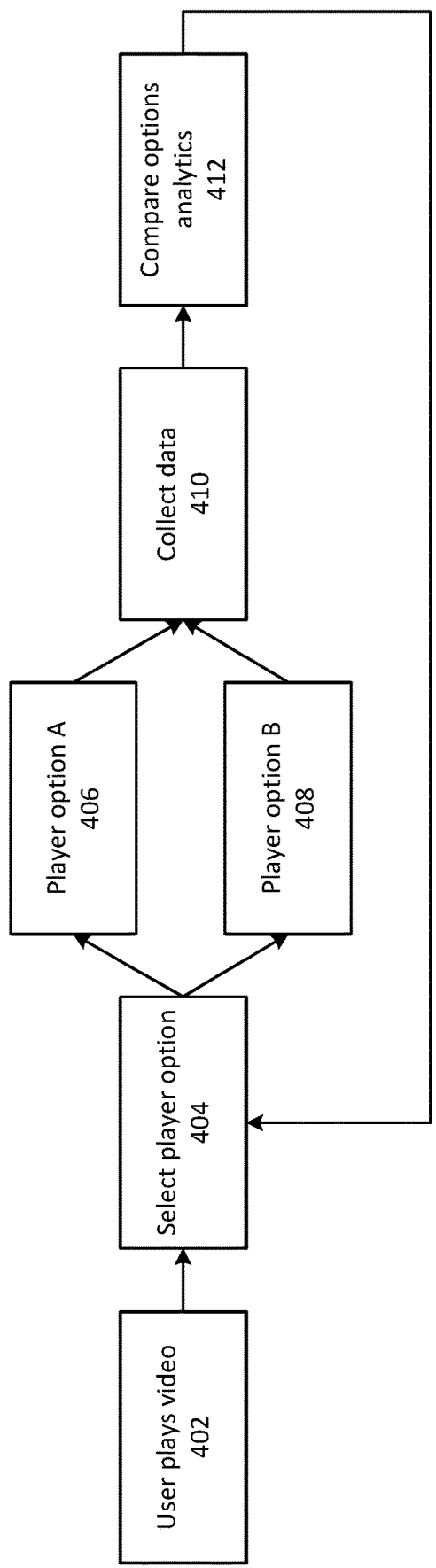
FIG. 6 depicts a process diagram for a video testing module, according to an implementation.

In another implementation, analyzer 30 includes a video testing module that manages options for the interactive media player and content and determines, based on analytics (such as the input data described above), which options to select. FIG. 6 depicts a process for making such a determination, according to one implementation. In Step 402, a user initiates playback of an interactive video. At Step 404, the interactive media player selects one or more options associated with the player and/or content. For example, a video tree structure that defines the interactive video can include multiple alternative options for a particular node, e.g., two different options for the starting node, one including a short and simple video (player option A 406), the other having a longer and more detailed video (player option B 408). Other exemplary options that can vary for the media player or content include (1) depicting video content in landscape vs. portrait mode; (2) using different length video nodes (e.g., 3 seconds, 5 seconds, 7 seconds, and so on); (3) including or not including tutorial content; (4) toggling autoplay of content; (5) starting audio on low volume, middle volume, high volume, or mute; and (6) displaying or hiding player controls. One will appreciate the near endless options that can be associated with the types of players and interactive media content described herein.

To start, the media player can select an option from a plurality of options using any suitable technique (e.g., random selection, alternating selection, etc.). Data is then collected regarding each playthrough of the interactive video, taking into account which options were selected for that playthrough (Step 410). In Step 412, after a period of time or a threshold number of plays, or otherwise after sufficient data to observe results of the different options has been collected, the video testing module compares the results for each of the options (or combinations of options) to determine which produces a more desirable result. For example, a desirable result may be an increased number of user engagements, shares, links out to publisher websites, comments, feedback, ratings, clicks, or purchases. Other desirable results of AB testing can include, for example, more time spent by a user with particular media content, an increase in revenue (e.g., resulting from increased interactions or time spent), more subscriptions to content, less buffering, and less drop off. A/B testing can also identify which nodes/content is watched or interacted with more relative to other content. The video testing module can track the options that produce the most desirable results (e.g., by storing relevant data in database 20), and on further plays of the interactive video, the media player and/or content can be automatically be configured to use such options. Using the example of the short and long video nodes, if the short video node produces more engagements with the interactive video than the long video node, the media player can be configured to favor providing the short video node to a user instead of the long video node (e.g., more than 50% of the time, more than 75% of the time, more than 90% of the time, 100% of the time).

In another implementation, analyzer 30 includes a fraud detector module that analyzes data collected in relation to an interactive media presentation and attempts to detect anomalous activity. In particular, such anomalous activity can include non-human, or "bot," activity, which may be an attempt to emulate human behavior for fraudulent purposes (e.g., creating fraudulent advertisement clicks or engagements; driving up views, likes, or dislikes; attempting to obtain a monetary or other benefit, etc.). If anomalous activity is detected, the fraud detector module can prevent the "user" from further playing or engaging with the interactive media presentation.

Figure 7:
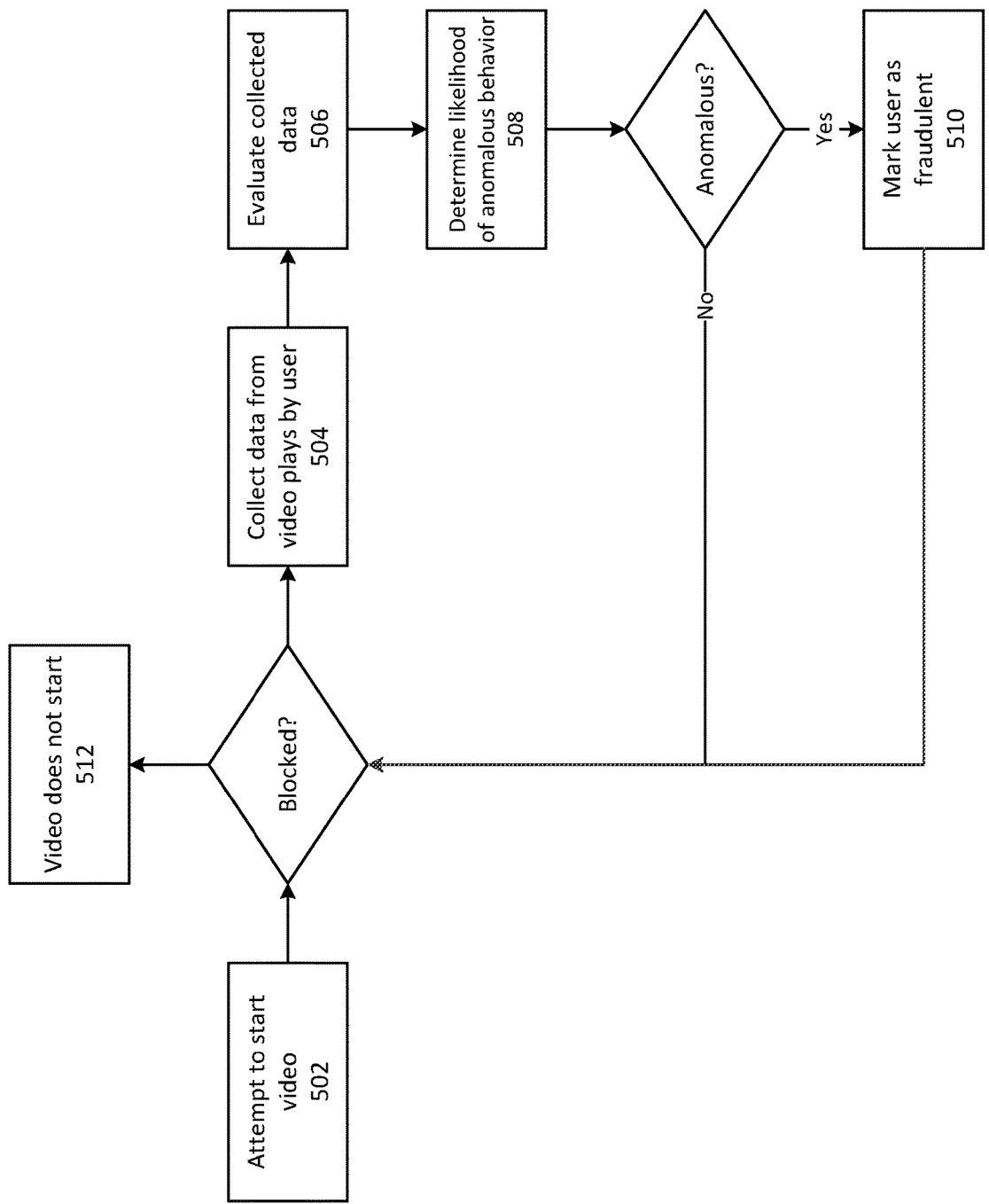
FIG. 7 depicts an example method for anomalous activity detection with respect to an interaction media presentation.

FIG. 7 depicts an example method for detecting anomalous activity with respect to an interactive media presentation. Beginning with Step 502, a user attempts to start an interactive video presentation. If the user is able to be identified in some manner (e.g., IP address, unique mobile device identifier, etc.), database 20 can be queried to determine whether the user has been blocked from viewing the video. If the user is not blocked, the presentation proceeds, and data relating to the user, the user's device, and/or the user's interactions with the video during each playthrough is collected (Step 504). In Step 506, the collected data is evaluated to identify any anomalous event(s) and, in Step 508, the anomalous event(s) (if any) are used to determine the likelihood that anomalous behavior exists. It may be difficult to identify anomalous activity after only one play (or a small number of plays) of the interactive video by a user. In the event the user proceeds to play the video additional times (and has not yet been blocked), further data can be collected and considered in conjunction with data from previous plays in determining whether anomalous activity is occurring (i.e., repeat Steps 504-508). If the result of Step 508 is a determination of anomalous activity, the user can be stored in database 20 as a fraudulent user (Step 510). For example, database 20 can store a blacklist of IP addresses associated with fraudulent users, and users originating from such IP addresses will be blocked from further attempts to play the interactive video. Blocked users can also be ignored for the purpose of tracking analytics for user populations.

The collected data can be evaluated for any appropriate indicator of anomalous activity. Examples include the following:

Anomalous activity: The user is not interacting with the interactive video content.
  Input: View and interaction events; URL; user identifier.
  Logic: The interactive video is viewed, but there are no interactive events associated with the view from the same URL or same user identifier.
Anomalous activity: The user interacts with the interactive video content only once or a specific number of times.
  Input: View and interaction events; URL; user identifier.
  Logic: The interactive video is viewed and there is one interactive event or the same number of interactive events over multiple playthroughs of the content (e.g., 2 times, 3 times, 5 times, or other suitable threshold, which may be based on the length of the video).
Anomalous activity: The playing time of the interactive video content is shorter than would normally be expected.
  Input: Playing time; number of nodes played; URL; user identifier.

Logic: The total playing time and/or number of nodes traversed falls below a threshold (e.g., per play threshold, or combined threshold over a certain number of plays or a certain period of time) for multiple plays originating from the same URL or the same user identifier.

Anomalous activity: User interacts only on a specific node or a specific set of nodes.

Input: Interaction and node start events; node names; URL; user identifier.

Logic: Interactions of a user occur on the same node or set of nodes over multiple plays of an interactive video, without interactions occurring on other nodes.

Anomalous activity: User interacts only at a specific time or at multiple specific times.

Input: Interaction events; playing times; URL; user identifier.

Logic: Interactions of a user occur at the same time(s) over multiple plays of an interactive video, without interactions occurring at other times.

Anomalous activity: User makes the same choices over multiple plays.

Input: Interaction events; paths; URL; user identifier.

Logic: The user makes the same choices, resulting in a traversal of the same path in a video tree structure, over multiple plays of an interactive video.

Anomalous activity: Multiple sessions from the same user.

Input: Session identifier; user identifier; session time.

Logic: Multiple sessions from the same user are detected within a particular period of time.

Anomalous activity: Multiple users originating from the same location.

Input: IP address; user identifier; session time.

Logic: Multiple differently identifiable users are detected as originating from the same IP address within a particular period of time.

Anomalous activity: Other non-random activity.

Input: Varies based on the activity.

Logic: Multiple views of an interactive video from the same or different users within a particular period of time, where the views are similar in one or more data points that would otherwise normally have a random distribution (e.g., number of interactions, decisions/options selected, shares, links out, comments, etc.).

In some implementations, the existence of one of the above anomalous activities is sufficient to make a determination that anomalous behavior exists and that the associated user should be blocked from further attempts to play the interactive video. In other implementations, a likelihood of anomalous behavior is calculated based on the occurrence of one anomalous activity occurring over multiple plays of an interactive video and/or the occurrence of multiple anomalous activities occurring over one or more plays of the interactive video. Each identified anomalous activity can have an associated risk score, with more unusual activities having higher associated risk scores. For example, the identification of a user that only interacts at a specific time in multiple plays of an interactive video may be more suspicious and have a higher risk score than the identification of multiple short plays of the video by the same user (e.g., there may be repeated technical issues with playback). Anomalous activities identified over a particular period of time and/or a particular number of plays can have their respective risk scores combined to create an overall risk score for an identified URL or user. Any suitable combination technique can be used, such as a running total, a running average, a weighted average, and so on. If the combined risk score exceeds a threshold acceptable risk score, the user can be blocked, associated analytics can be ignored, and/or other responsive action can be taken.

In a further implementation, analyzer 30 includes a model behavior module that models user behavior based on user data and engagement with interactive content. For example, this module can track (1) number of user interactions with interactive content; (2) timing and cadence of interactions with interactive content; (3) places of user interactions with interactive content (e.g., portion of screen where the user taps or clicks, nodes at which interaction occurs, etc.); (4) instances of seek, pause, replay, volume change, and other media player control interactions; (5) occurrences and types of user feedback; (6) content preferences; (7) likes, dislikes, ratings, shares, and other social media-type interactions; and (8) user demographic data, user device characteristics, browser type, geographic location, and other types of data described herein. Other types of data appropriate for modeling user behavior can be collected.

A machine learning or pattern recognition behavioral model can be trained on a data set of user behaviors and recommended changes in user experience based on the behaviors. Once the model is trained, data associated with a user's behavior can be collected and input into the model, and the user's experience can be dynamically changed (instantly and/or for future plays of interactive content) based on the output of the model. Changes in user experience can include (1) predictive loading, such that, if a user has similar behavior and/or characteristics to users that follow a specific path through an interactive video, the system can cause the media player to preload the content associated with that path; (2) if the user has similar behavior and/or characteristics to users that skip advertisements, show the user fewer and/or shorter advertisements; (3) if the user has similar behavior and/or characteristics to users that rotate the video and watch in landscape mode, start the video in landscape mode; and 94) if the user has similar behavior and/or characteristics to users that interact more or view more advertisements, dedicate additional marketing efforts (e.g., display more advertisements, provide better offers, etc.) to the user. The foregoing examples are merely illustrative. It will be appreciated that there are many different ways that a user's experience can be improved.

In some implementations, the behavioral model can be used as an alternative or supplemental technique for identifying anomalous activity. For example, the model can be trained on a data set of anomalous or malicious user behaviors with respect to interactive video content, such that it can recognize patterns of suspicious or fraudulent behavior. In one instance, identification of such behavior by the model can result in blocking the offending user from further plays of the interactive video content. In other instances, identification of the behavior is only one factor considered in determining a likelihood of anomalous behavior, as described above.

Although the systems and methods described herein relate primarily to audio and video playback, the invention is equally applicable to various streaming and non-streaming media, including animation, video games, interactive media, and other forms of content usable in conjunction with the present systems and methods. Further, there can be more than one audio, video, and/or other media content stream played in synchronization with other streams. Streaming media can include, for example, multimedia content that is continuously presented to a user while it is received from a content delivery source, such as a remote video server. If a source media file is in a format that cannot be streamed and/or does not allow for seamless connections between segments, the media file can be transcoded or converted into a format supporting streaming and/or seamless transitions.

While various implementations of the present invention have been described herein, it should be understood that they have been presented by example only. For example, one of skill in the art will appreciate that the techniques for creating seamless audio segments can be applied to creating seamless video segments and other forms of seamless media as well. Where methods and steps described above indicate certain events occurring in certain order, those of ordinary skill in the art having the benefit of this disclosure would recognize that the ordering of certain steps can be modified and that such modifications are in accordance with the given variations. For example, although various implementations have been described as having particular features and/or combinations of components, other implementations are possible having any combination or sub-combination of any features and/or components from any of the implementations described herein.

The invention claimed is:

1. A computer-implemented method for identifying anomalous activity with respect to interactive videos, the method comprising:
receiving an interactive video defined by a tree structure, the tree structure comprising a plurality of branches of the interactive video, each branch comprising one or more nodes having respective video segments;
during a plurality of playthroughs of the interactive video to a user, tracking information associated with the playthroughs;
attributing a score to each of a plurality of anomalous activity factors identified based on the information; and
determining, whether the user is likely to be a non-human user based on a combination of the scores.

2. The method of claim 1, wherein tracking information associated with the playthroughs comprises determining that the user is not interacting with the interactive video.

3. The method of claim 1, wherein tracking information associated with the playthroughs comprises determining that the user interacts a same number of times with the interactive video during each of the playthroughs.

4. The method of claim 1, wherein tracking information associated with the playthroughs comprises determining that the user traverses a same branch of the tree structure during each of the playthroughs.

5. The method of claim 1, wherein tracking information associated with the playthroughs comprises determining that (i) the user interacts with a same node in the tree structure in each of the playthroughs and/or (ii) the user interacts with the interactive video at a same time in each of the playthroughs.

6. The method of claim 1, wherein tracking information associated with the playthroughs comprises identifying an existence of a plurality of sessions from the user within a particular time period.

7. The method of claim 1, wherein tracking information associated with the playthroughs comprises determining that actions of the user with respect to the interactive video do not follow a random distribution.

8. The method of claim 1, wherein determining whether the user is likely to be a non-human user comprises determining whether behavioral information associated with user engagement with the interactive video is consistent with a model representing typical human user behavior.

9. The method of claim 1, further comprising blocking the user from a further playthrough of the interactive video in response to determining that the user is likely a non-human user.

10. A system comprising:
at least one memory for storing computer-executable instructions; and
at least one processor for executing the instructions stored on the memory, wherein execution of the instructions programs the at least one processor to perform operations comprising:
receiving an interactive video defined by a tree structure, the tree structure comprising a plurality of branches of the interactive video, each branch comprising one or more nodes having respective video segments;
during a plurality of playthroughs of the interactive video to a user, tracking information associated with the playthroughs;
attributing a score to each of a plurality of anomalous activity factors identified based on the information; and
determining, whether the user is likely to be a non-human user based on a combination of the scores.

11. The system of claim 10, wherein tracking information associated with the playthroughs comprises determining that the user is not interacting with the interactive video.

12. The system of claim 10, wherein tracking information associated with the playthroughs comprises determining that the user interacts a same number of times with the interactive video during each of the playthroughs.

13. The system of claim 10, wherein tracking information associated with the playthroughs comprises determining that the user traverses a same branch of the tree structure during each of the playthroughs.

14. The system of claim 10, wherein tracking information associated with the playthroughs comprises determining that (i) the user interacts with a same node in the tree structure in each of the playthroughs and/or (ii) the user interacts with the interactive video at a same time in each of the playthroughs.

15. The system of claim 10, wherein tracking information associated with the playthroughs comprises identifying an existence of a plurality of sessions from the user within a particular time period.

16. The system of claim 10, wherein tracking information associated with the playthroughs comprises determining that actions of the user with respect to the interactive video do not follow a random distribution.

17. The system of claim 10, wherein determining whether the user is likely to be a non-human user comprises determining whether behavioral information associated with user engagement with the interactive video is consistent with a model representing typical human user behavior.

18. The system of claim 10, wherein the operations further comprise blocking the user from a further playthrough of the interactive video in response to determining that the user is likely a non-human user.

19. A computer-implemented method for identifying anomalous activity with respect to interactive videos, the method comprising:
receiving an interactive video defined by a tree structure, the tree structure comprising a plurality of branches of the interactive video, each branch comprising one or more nodes having respective video segments;

during a plurality of playthroughs of the interactive video to a user, tracking information associated with the playthroughs; and determining, based on the information, whether the user is likely to be a non-human user, wherein tracking information associated with the playthroughs comprises identifying an existence of a plurality of sessions from the user within a particular time period.

20. A computer-implemented method for identifying anomalous activity with respect to interactive videos, the method comprising:

receiving an interactive video defined by a tree structure, the tree structure comprising a plurality of branches of the interactive video, each branch comprising one or more nodes having respective video segments;

during a plurality of playthroughs of the interactive video to a user, tracking information associated with the playthroughs; and determining, based on the information, whether the user is likely to be a non-human user, wherein tracking information associated with the playthroughs comprises determining that actions of the user with respect to the interactive video do not follow a random distribution.

\* \* \* \* \*